(12) United States Patent
Shurtleff et al.

(10) Patent No.: US 11,102,236 B2
(45) Date of Patent: Aug. 24, 2021

(54) SYSTEMS AND METHODS FOR REMEDIATING INTERNET OF THINGS DEVICES

(71) Applicant: Cisco Technology, Inc., San Jose, CA (US)

(72) Inventors: Mark Stephan Shurtleff, Hayward, CA (US); Jerome Henry, Pittsboro, NC (US); Bart Brinckman, Nevele (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 186 days.

(21) Appl. No.: 16/195,756

(22) Filed: Nov. 19, 2018

(65) Prior Publication Data
US 2020/0162503 A1 May 21, 2020

(51) Int. Cl.
| | | |
|---|---|---|
| *H04L 29/06* | (2006.01) | |
| *G06F 9/451* | (2018.01) | |
| *H04L 12/24* | (2006.01) | |
| *H04L 12/26* | (2006.01) | |
| *G06F 17/18* | (2006.01) | |
| *H04L 29/08* | (2006.01) | |

(52) U.S. Cl.
CPC ......... *H04L 63/1441* (2013.01); *G06F 9/451* (2018.02); *H04L 41/0893* (2013.01); *H04L 41/0896* (2013.01); *H04L 41/142* (2013.01); *H04L 41/22* (2013.01); *H04L 43/065* (2013.01); *H04L 63/1416* (2013.01); *H04L 63/1425* (2013.01); *H04L 63/20* (2013.01); *G06F 17/18* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 9,565,192 B2* | 2/2017 | Chillappa | ............... | H04W 4/38 |
| 9,942,235 B2* | 4/2018 | Bagasra | ................ | H04W 12/08 |
| 10,013,303 B2* | 7/2018 | Pallath | .................... | G05B 23/02 |
| 2006/0018478 A1* | 1/2006 | Diefenderfer | ....... | H04L 63/0435 |
| | | | | 380/259 |
| 2006/0053476 A1* | 3/2006 | Bezilla | .................. | G06F 21/552 |
| | | | | 726/1 |
| 2010/0241739 A1* | 9/2010 | Reus | ....................... | G06F 21/62 |
| | | | | 709/222 |

(Continued)

*Primary Examiner* — William J. Goodchild
(74) *Attorney, Agent, or Firm* — Polsinelli PC

(57) ABSTRACT

Systems and methods provide for identification and remediation of IoT devices exhibiting anomalous behaviors. An IoT management system can identify IoT devices requiring remediation. The IoT management system may present a first interface including representations of the devices requiring remediation, where each representation can include identifying information for an IoT device, policies applied to the IoT device, and bandwidth/throughput information of the IoT device. The IoT management system can present a second remediation interface representing a detailed representation of a first IoT device. The detailed representation can include user interface elements representing actions to be performed relating to the first IoT device. The IoT management system can perform a first action corresponding to a selection of one of the user interface elements.

20 Claims, 10 Drawing Sheets

(56) References Cited

U.S. PATENT DOCUMENTS

| | | | | |
|---|---|---|---|---|
| 2016/0127367 A1* | 5/2016 | Jevans | .................... | G06F 21/10 |
| | | | | 713/152 |
| 2016/0173447 A1* | 6/2016 | Achim | ................ | H04L 63/1416 |
| | | | | 726/11 |
| 2016/0366181 A1* | 12/2016 | Smith | .................... | G06F 21/57 |
| 2017/0126578 A1* | 5/2017 | Amulothu | ............... | H04L 47/70 |
| 2017/0345420 A1* | 11/2017 | Barnett, Jr. | ............. | G10L 15/22 |
| 2018/0284758 A1* | 10/2018 | Cella | .................. | G06K 9/6263 |
| 2019/0173684 A1* | 6/2019 | Ocher | ................ | H04L 12/2816 |
| 2019/0334934 A1* | 10/2019 | Teshome | ............... | H04L 63/123 |

\* cited by examiner

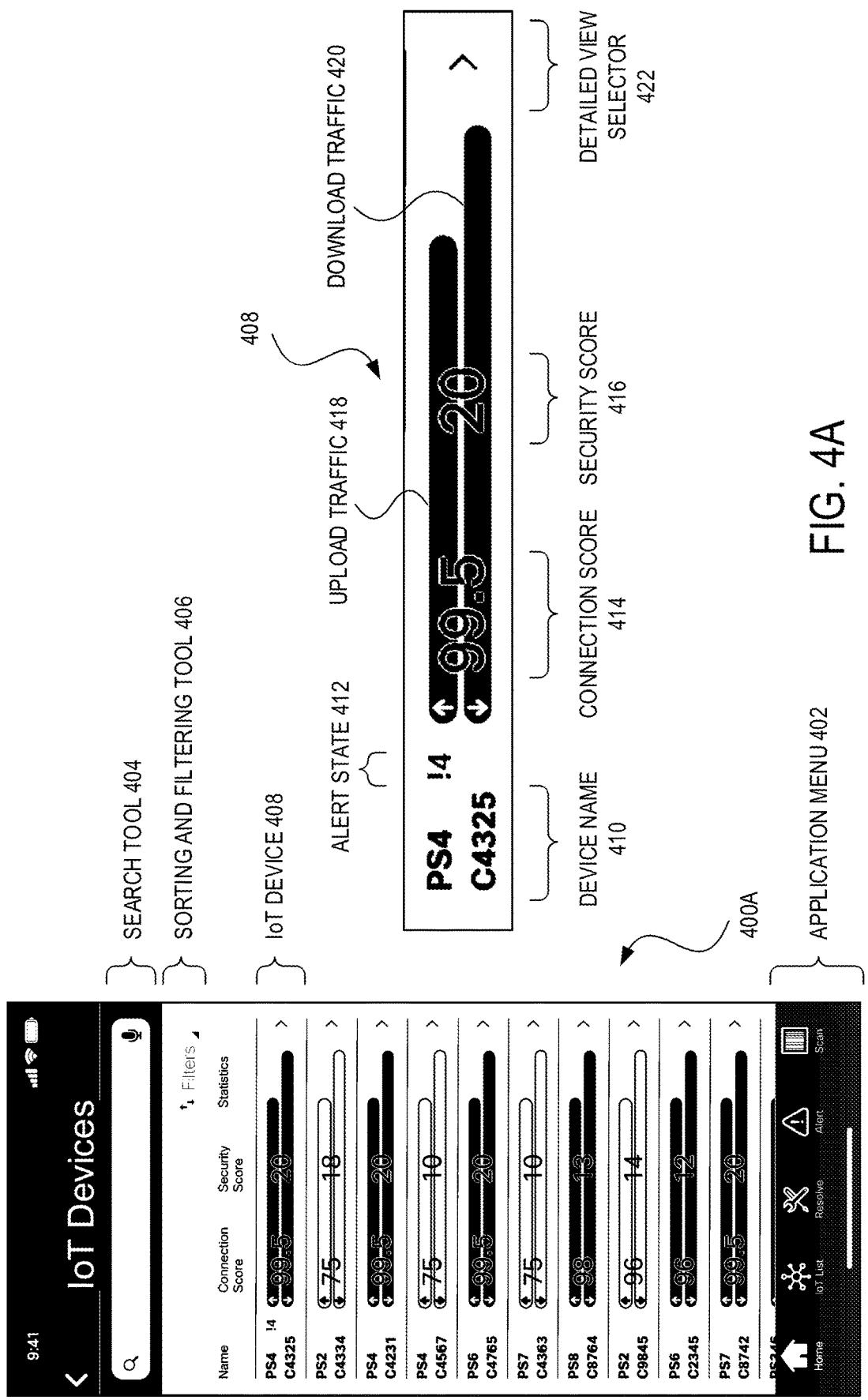

SYSTEMS AND METHODS FOR REMEDIATING INTERNET OF THINGS DEVICES

TECHNICAL FIELD

The subject matter of this disclosure relates in general to the field of telecommunications networks, and more particularly, to systems and methods for identifying and remediating Internet of Things (IoT) devices exhibiting anomalous behaviors.

BACKGROUND

The next evolution of the Internet is the ability to connect any object over a communications network (rather than just connecting general purpose computing devices). These objects can include, among other things, lighting; appliances; medical devices; factory equipment; vehicles; cameras; media players (e.g., televisions, set-top boxes, speakers, video game consoles, etc.); heating, ventilating, and air-conditioning (HVAC); windows and window shades and blinds; doors; locks; and so forth. This interconnection of everyday objects over a computer network (e.g., the public Internet, a private wide area network (WAN), etc.) is sometimes referred to as the Internet of Things (IoT). IoT networks can operate within wireless (e.g., 2G, 3G, 4G, 5G, and other cellular protocols; Bluetooth® or Bluetooth® Low Energy (BLE), Institute of Electrical and Electronic Engineers (IEEE) 802.11 or other wireless fidelity (Wi-Fi) standards; Narrowband IoT (NB-IoT); Near field communication (NFC); Radio frequency identification (RFID); ZigBee®; Z-Wave®; etc.) or wired networks (e.g., Digital Subscriber Line (DSL), Ethernet, Fiber Distributed Data Interface (FDDI), Integrated Services Digital Network (ISDN), Power-Line Communication, etc.). IoT networks can comprise a handful of devices to thousands or even millions of devices, and can support point-to-point traffic (between devices inside the network), point-to-multipoint traffic (from a central control point such as a root node to a subset of devices inside the network), and multipoint-to-point traffic (from devices inside the network towards a central control point). IoT can present new challenges for network and security administration given the potentially vast number of devices to manage in a network; the wide divergence in functionality, network access requirements, and network usage between and among different types of IoT devices; and the rapidity with which security breaches and performance degradation of IoT devices can occur to overwhelm administration of the network. Current IoT management platforms may not adequately address these problems of scale, heterogeneity, and responsivity.

BRIEF DESCRIPTION OF THE FIGURES

To provide a more complete understanding of the present disclosure and features and advantages thereof, reference is made to the following description, taken in conjunction with the accompanying drawings, in which:

FIGS. 4A-4E illustrate examples of remediation interfaces for a client application of an IoT management system in accordance with an embodiment;

DESCRIPTION OF EXAMPLE EMBODIMENTS

Figure 1:
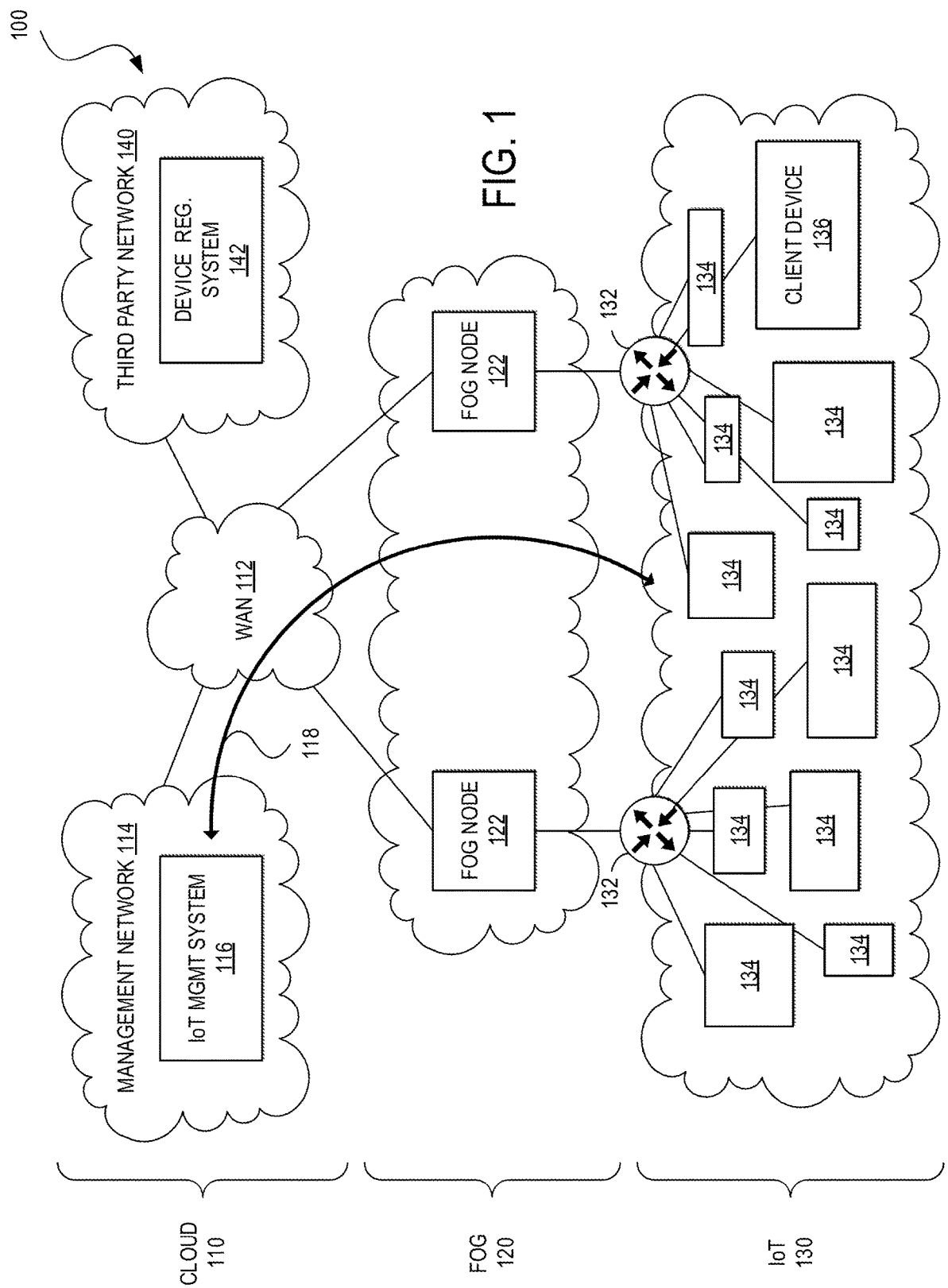
FIG. 1 illustrates an example of a network environment in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for identification and remediation of IoT devices exhibiting anomalous behaviors. An IoT management system can identify a plurality of IoT devices that have been marked for remediation (e.g., devices exhibiting one or more anomalies when evaluated against network policies, application policies, device policies, device profiles, or clustering or classification machine learning models, etc.). The IoT management system can present (e.g., via a client device) a first remediation interface including a plurality of representations of the plurality of IoT devices marked for remediation. Each representation of the plurality of representations may include identifying information for an IoT device (e.g., name, serial number, IP address, MAC address, etc.); one or more policies applied to the IoT device (e.g., white labeled or white listed, quarantined, black listed, etc.); and bandwidth (sometimes also referred to as capacity, traffic volume, network usage, etc., and can be expressed as Mb, MB, Gb, GB, Tb, TB, etc.), throughput (e.g., sometimes also referred to as data transfer rate, data rate, bit rate, etc., and can be expressed as Mb/s, Gb/s, Tb/s, etc.), and other network traffic metrics of the IoT device. In addition or alternatively, the bandwidth, throughput, and/or other network traffic metrics can be provided as a number of standards of deviation from a mean, median, mode, or expected value from historical values of the IoT device. The IoT management system can present (e.g., via the mobile computing device or other client device) a second remediation interface representing a detailed representation of a first IoT device of the plurality of IoT devices marked for remediation. The detailed representation can include a plurality of user interface elements representing a plurality of actions to be performed relating to the first IoT device (e.g., white labeling or white listing the device, quarantining the device, black listing the device, pinging the device, etc.). The IoT management system can perform a first action of the plurality of actions corresponding to a selection of the one of the plurality of user interface elements.

Example Embodiments

Households, businesses, and other organizations are increasingly incorporating IoT devices into their networks for automating home, work, campus, and other environments. For example, a typical campus or enterprise network may comprise a few hundred or a few thousand general purpose computing devices (e.g., servers, desktop computers, laptops, etc.) or mobile computing devices (e.g., tablets, smartphones, wearable devices, etc.), which can mean the network may include tens of thousands or more IoT devices. The proliferation of IoT devices can thus represent substantial growth in the duties and responsibilities of administrators tasked with securing and managing their networks. Solutions currently exist for remediating anomalies associated with general purpose computing devices and mobile computing devices, such as using access control lists (ACLs) or Layer 7 (L7) or application layer filters for prohibiting certain applications from running in the network or preventing access to blocked sites. IoT devices, however, can behave anomalously in manners distinct from general purpose computing devices, such as by sending an abnormal amount of traffic (too much or not enough) on both forbidden and accessible ports. Monitoring these types of deviations at the scale of tens of thousands of devices is beyond the capabilities of current solutions, especially as device attacks can occur at a massive scale.

Various embodiments of the present disclosure can overcome the above and other deficiencies of the prior art by identifying IoT devices behaving anomalously and adding them to an interface that is capable of supporting the scale of IoT and that presents critical information in real time and in a manner to expeditiously remediate the IoT devices. In some embodiments, a network administrator can interact with an IoT management system via a client application executing on a client device to manage and secure IoT devices of a network. The IoT management system can identify compromised or potentially comprised IoT devices, add them to a remediation interface, and present (e.g., transmit to the client application for display on a screen of the client device) them as compact representations to enable the network administrator to quickly discover the anomalies and remediate the IoT devices. Unlike prior art systems which require multiple screens to convey the information necessary to troubleshoot managed devices and/or extensive effort by a network administrator to investigate and diagnose anomalous behaviors, various embodiments of the present disclosure automate much of the investigation and diagnosis, present the analysis in a manner to support the scale of IoT, and substantially reduce labor on the part of the network administrator. In some embodiments, the client application may even be capable of running on a general purpose mobile computing device such that, from anywhere in the world, an end user can have immediate access to a wide array of sophisticated tools for IoT management and security. Various other functions and advantages are described and suggested below as may be provided in accordance with the various embodiments.

FIG. 1 illustrates an example of a network environment 100 in which the subject technology may be deployed. It should be understood that, for the network environment 100 and any network discussed herein, there can be additional or fewer nodes, devices, links, networks, or components in similar or alternative configurations. Example embodiments with different numbers and/or types of endpoints, networks, nodes, cloud components, servers, software components, devices, virtual or physical resources, configurations, topologies, services, appliances, deployments, or networking devices are also contemplated herein. Further, the network environment 100 can include any number or type of resources, which can be accessed and utilized by endpoints or tenants. The illustrations and examples provided herein are for clarity and simplicity.

In this example, the network environment 100 can comprise multiple layers (also sometimes referred to as clouds or networks), such as a cloud layer 110, a fog layer 120, and an IoT layer 130. The cloud layer 110 may include a wide area network (WAN) 112 (e.g., the Internet or a private IP network), a management network 114 (e.g., third-party public cloud provider, data center, enterprise network, etc.), and a third party network 140. The WAN 112 may connect, directly or indirectly, elements of the cloud layer 110, the fog layer 120, and/or the IoT layer 130. For instance, although the WAN 112, here, connects the management network 114 to the fog layer 120, other embodiments may alternatively or additionally connect the management network 114 directly to the IoT layer 130, connect the management network 114 directly to the fog layer 120, connect the management network 114 to the IoT layer 130 via the WAN 112, connect the fog layer 120 to the IoT layer 130 via the WAN 112, and so forth.

The management network 114 can host an IoT management system 116 for managing and controlling elements of the cloud layer 110, the fog layer 120, and/or the IoT layer 130. The cloud-hosted IoT management system 116 can comprise one or more physical or virtual servers and networking devices (e.g., switches, routers, firewalls, load balancers, etc.) (not shown) that may be configured to manage the configuration and operation of various devices in an intermediate network (e.g., the fog layer 120); a local area network (LAN), such as the IoT cloud 130; and/or across geographically distributed portions of one or more virtual LANs (VLANs). The cloud-hosted IoT management system 116 can manage cloud operations, device communications, service provisioning, network configuration and monitoring, and so forth. The IoT management system 116 can also store configuration information, statistics, monitoring information, and other management data relating to the fog cloud 120 and/or IoT cloud 130. In some implementations, Cisco Jasper® Control Center can operate as the IoT management system 116.

In some embodiments, a secure connection 118 can be established between the management network 114, the fog layer 120, and/or the IoT layer 130, such as via one or more security appliances or other networking devices of the management network 114, the IoT management system 116, the fog cloud 120, and/or the IoT cloud 130. In addition to establishing the secure connection 118, in some embodiments, the security appliances or other networking devices can also provide other services, such as virtual private network (VPN) concentration, firewalling, directory services, certificate authority services, policy management, intrusion detection and prevention, load balancing, WAN acceleration, content filtering, and so forth. The secure connection 118 can be used by devices of the management network 114, the IoT management system 116, the fog cloud 120, and/or the IoT cloud 130 to exchange management data (e.g., configuration, statistical, or monitoring data). The secure connection 118 can be implemented in various ways, such as utilizing VPN or L2 tunneling protocols. In some embodiments, an open VPN (e.g., OpenVPN) overlay or an IP Security (IPSec) VPN-based L3 network extension can be used to provide the secure connection 118. In other embodiments, a secure transport layer (i.e., L4) tunnel can be used as the secure connection 118 between the IoT management system 116, the fog cloud 120, and the IoT cloud 130, such as by utilizing Transport Layer Security (TLS), Datagram TLS (DTLS), Secure Socket Layer (SSL), etc., across the WAN 112.

The secure connection 118 may utilize portions of the WAN 112. For example, packets that are transmitted via the secure connection 118 can be marked and/or contain header fields that enable the prioritization of the secure tunnel packets on at least some portions of the WAN 112. In some embodiments, the prioritization of the secure tunnel packets can include the use of private, dedicated routing paths between the management network 114, the fog cloud 120, and/or the IoT cloud 130 to reduce latency and/or improve reliability.

Fog computing is an example of an approach for cloud computing that can include an intermediate layer between remote centralized and/or shared resources (e.g., the cloud layer 110) and local networks (e.g., the IoT layer 130). That is, fog computing can entail using layers of devices at or near the network edge to provide application services to the local nodes in the network, in contrast to pure cloud-based approaches that rely on remote data centers/cloud environments for the services. To this end, the fog layer 120 can include various fog nodes 122 or functional nodes deployed close to IoT devices (e.g., the IoT devices 134) to provide computing, storage, and networking resources and services. The multiple fog nodes 122 organized or configured together can form a fog system, to implement a particular solution. The fog nodes 122 and/or fog systems can have the same or complementary capabilities, in various implementations. That is, each individual fog node 122 does not have to implement the entire spectrum of capabilities. Instead, the fog capabilities may be distributed across multiple fog nodes 122 and systems, which may collaborate to help each other to provide the desired services. Thus, a fog system can include any number of virtualized services and/or data stores that are spread across the distributed fog nodes 122. This may include a master-slave configuration, publish-subscribe configuration, or peer-to-peer configuration. Resources in the fog layer 120 may be shared between different users, applications, organizations, tenants, or other entities.

The IoT cloud 130 can comprise various devices or nodes, including networking devices 132 (e.g., switches, routers, gateways, network appliances, etc.), IoT devices 134, and a client device 136. In general, the IoT devices 134 can be any object capable of electronically transmitting data to another device over the WAN 112 (directly or indirectly), such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, WiFi access points, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth. In some embodiments, the IoT devices 134 can also include general purpose computing devices (e.g., servers, desktops, or laptops, etc.) or general purpose mobile computing devices, such as tablets, smartphones, wearable devices (e.g., watches, glasses or other head-mounted displays (HMDs), hearing devices, etc.), and so forth.

The IoT devices 134 may communicate using wired (e.g., IEEE 802.3 (Ethernet), PLC, public switched telephone network (PSTN), etc.) or wireless (e.g., 2G or greater generation cellular, Wi-Fi, Bluetooth® Low Energy (BLE), ZigBee®, Z-Wave®, Narrowband-IoT (NB-IoT), Near Field Communications (NFC™), RFID, etc.) technologies. The IoT devices 134 can also utilize protocols across higher layers of the network stack (e.g., the Open Systems Interconnection (OSI) model, the TCP/IP stack, etc.), such as Transmission Control Protocol (TCP)/Internet Protocol (IP), User Datagram Protocol (UDP), Hypertext Transfer Protocol (HTTP), Message Queuing Telemetry Transport (MQTT), Constrained Application Protocol (CoAP), Extensible Messaging and Presence Protocol (XMPP), Data Distribution Service (DDS), Advanced Message Queuing Protocol (AMQP), and so forth. Each of the IoT devices 134 can include one or more processors, one or more types of memory, a display and/or other user interface components such as a keyboard, touch screen display, mouse, track-pad, digital camera, and/or any number of peripheral devices or components to add functionality to each IoT device. The IoT devices 134 can also be capable of protocol processing, modulation, demodulation, data buffering, power control, routing, switching, clock recovery, amplification, decoding, and/or error control.

The IoT cloud 130 can also include a client device 136 to enable an end user to interface with the IoT management system 116 to manage the IoT devices 134 and/or the client device itself. Although the client device 136 is shown here as located in the IoT cloud 130, it will be understood by one of ordinary skill in the art that the client device 136 can be located anywhere so long as the device can connect to the IoT management system 116 (e.g., via the WAN 112). In addition, the client device 136 can itself be considered to be an IoT device and/or can be managed by the IoT management system 116. The client device 136 can include software (e.g., a web browser, a standalone application or app, a shell program, etc.) to interact with the IoT management system 116 as discussed further below.

The third party network 140 can provide various third-party content and services, such as hardware, firmware, and/or software upgrades; network security services; media content (e.g., audio for devices with microphones, video for devices with cameras, etc.); and so forth. In this example, the third party network 140 can include a device registration system 142 for registering the networking devices 132, the IoT devices 134, and/or the client device 136, and identifying the level of access to the network environment 100 the devices may need to operate. An example of an implementation of the registration process is discussed further below.

Figure 2:
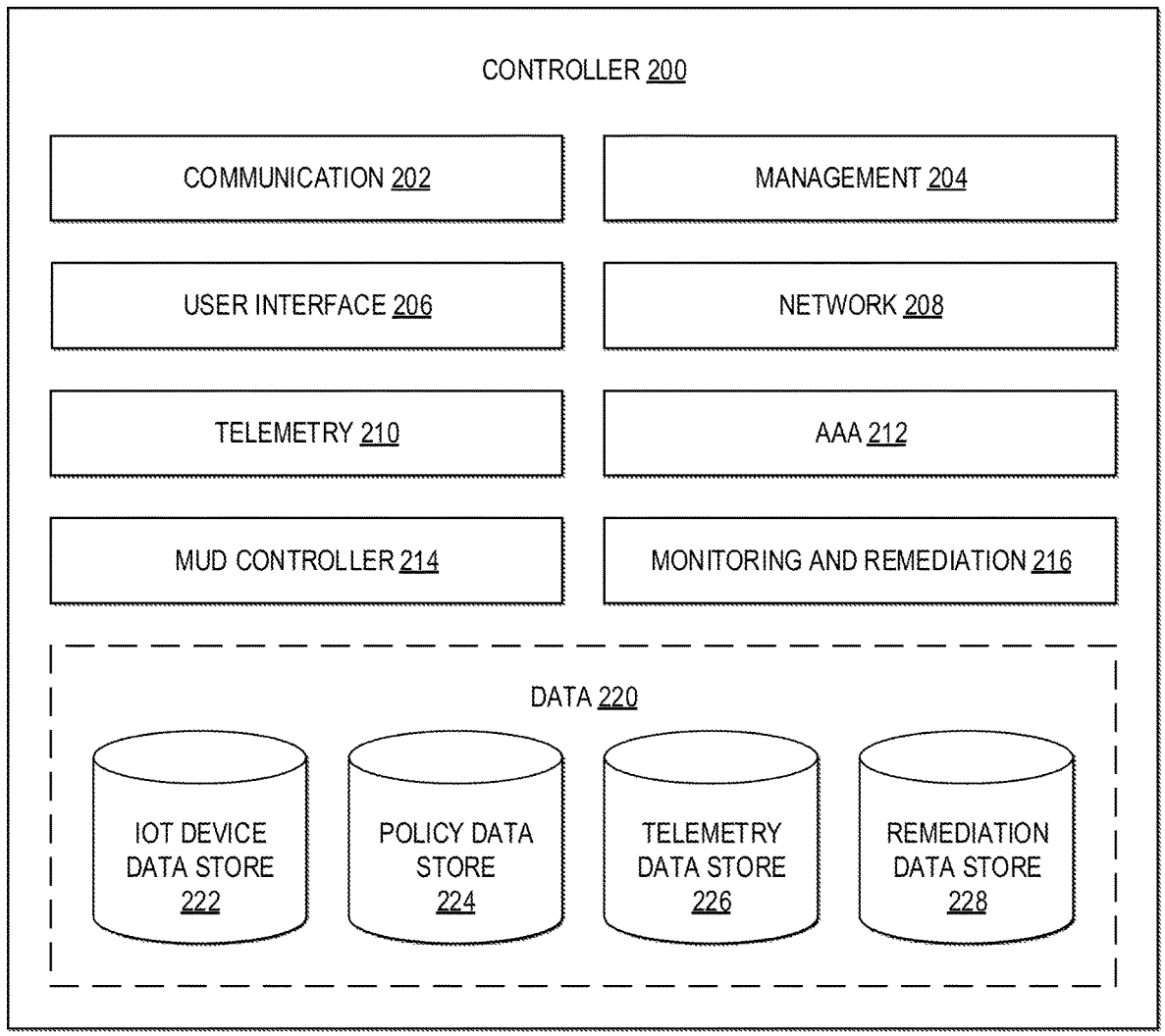
FIG. 2 illustrates an example of a cloud-based network controller in accordance with an embodiment.

FIG. 2 illustrates an example of a cloud-based network controller 200 for managing and controlling elements of a management network (e.g., the management network 114), an IoT management system (e.g., the IoT management system 116), a fog network (e.g., the fog cloud 120), and/or one or more private LANs or VLANs (e.g., the IoT cloud 130). One of ordinary skill in the art will understand that, for the network controller 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network controller 200 can be remotely hosted in a management network (e.g., the management network 114) for managing and controlling networking devices (e.g., the networking devices 132) and/or endpoints (e.g., the fog nodes 122, the IoT devices 134, the client device 136, etc.) for customers of the provider of the management network. The network controller 200 can manage various cloud services, such as provisioning cloud resources in the management network, configuring and updating the cloud resources, monitoring the cloud resources, implementing high availability and failover for the cloud resources, enforcing security and compliance for the cloud resources, and so forth. The network controller 200 can also send network data to and receive network data from devices to facilitate configuration of devices; track the private network and status information of elements of the private network, such as a secure connection (e.g., the secure connection 118), networking devices, and endpoints, among other elements; and administer the private network and the elements of the private network.

The network controller 200 can include several components or modules, such as a communication subsystem 202; a management subsystem 204; a user interface subsystem 206; a network subsystem 208; a telemetry subsystem 210; an authentication, authorization, and accounting (AAA) subsystem 212; a manufacturer usage description (MUD) controller 214, a monitoring and remediation subsystem 216, and a data subsystem 220. These modules may be implemented as hardware, firmware, and/or software. Although FIG. 2 illustrates an example configuration of the various components of the network controller 200, one of skill in the art will understand that the components of network controller 200 or any device described herein can be configured in a number of different ways and can include any other type and number of components. For example, the management subsystem 204 and the network subsystem 208 can belong to one software module or multiple separate modules. Other modules can also be combined into fewer components and/or further divided into more components.

The communication subsystem 202 may allow the network controller 200 to communicate with endpoints, as well as any other device or network. The communication subsystem 202 can comprise a network interface card (NIC), and can include wired and/or wireless capabilities. The communication subsystem 202 may allow the network controller 200 to send and receive data from other devices and networks. The network controller 200 can include multiple communications interfaces for redundancy or failover. For example, the network controller 200 can include dual NICs for connection redundancy.

The management subsystem 204 can include logic to perform management operations. For example, the management subsystem 204 can include logic to allow the various components of the network controller 200 to interface and work together. The management subsystem 204 can also include logic, functions, software, and procedures to allow the network controller 200 to perform management, control, and administration of devices in a private network, applications in the private network, services provided to the devices, or any other component or procedure. The management subsystem 204 can include logic to operate the network controller 200 and perform particular services configured by the network controller 200. The management subsystem 204 may also support high availability and initiate, enable, or launch additional servers, virtual machines, containers, or other computing instances for running the network controller 200. In some embodiments, the management subsystem 204 can manage nodes, resources, settings, policies, protocols, communications, and so forth.

The user interface subsystem 206 can support a frontend that an end user can interact with to access or consume cloud services. For instance, the user interface subsystem 206 can be implemented within a web application/web server accessible by a web browser or an application/application server accessible by a desktop application, a mobile app, a shell program or other command line interface, an Application Programming Interface (e.g., restful state transfer (REST), Simple Object Access Protocol (SOAP), Service Oriented Architecture (SOA), etc.), and/or other suitable interface in which the end user can configure devices or private networks that are cloud-managed, provide user preferences, specify policies, enter data, review statistics, configure interactions or operations, and so forth. The user interface subsystem 206 may also provide visibility information, such as views of a private network or devices. For example, the user interface subsystem 206 can provide a view of the status or conditions of the private network, the operations taking place, services, performance, a topology or layout, specific networking devices, protocols implemented, running processes, errors, notifications, alerts, network structure, ongoing communications, data analysis, and so forth.

In some embodiments, the user interface subsystem 206 can interact with client devices via a graphical user interface (GUI) to enable users to monitor a private network, devices, statistics, errors, notifications, and so forth, and make modifications or setting changes through the GUI. The GUI can depict charts, lists, tables, maps, topologies, symbols, structures, or any graphical object or element. In addition, the GUI can use color, font, shapes, or any other characteristics to depict scores, alerts, or conditions. In some embodiments, the user interface subsystem 206 can also handle user or device requests. For example, an administrator or a device can enter a service request through the user interface subsystem 206.

The network subsystem 208 can perform networking calculations, such as network addressing or networking service or operations, such as auto VPN configuration or traffic routing. The network subsystem 208 may also perform filtering functions, switching functions, failover functions, high availability functions, network or device deployment functions, resource allocation functions, messaging functions, traffic analysis functions, port configuration functions, mapping functions, packet manipulation functions, path calculation functions, loop detection, cost calculation, error detection, or otherwise manipulate data or networking devices. In some embodiments, the network subsystem 208 can handle networking requests from other networks or devices and establish links between devices. In some embodiments, the network subsystem 208 can perform queuing, messaging, and protocol operations.

The telemetry subsystem 210 can collect network traffic data across the network and for individual devices in the network. The network traffic data can include information for individual packets (e.g., packet size, source address, source port, destination address, destination port, protocol, etc.) (sometimes also referred to as tuple information); flows (e.g., tuple information, number of packets and aggregate size of packets having the same or similar tuple information, class of service, router/switch interface, packet inter-arrival times, flow start time, flow end time, duration, TCP flags, etc.); bidirectional flows (e.g., flow data for a request/response pair of flows having corresponding tuple information) (sometimes also referred to as connections); and sessions (e.g., multiple bidirectional flows or connections)

(sometimes also referred to as calls as in Voice over IP (VoIP) calls); and/or other units of network data at various levels of granularity. The telemetry subsystem 210 can alternatively or additionally capture or compute statistical information (e.g., mean, median, mode, minimum, maximum, standard deviation(s), etc.) and/or other measures of network performance (e.g., bandwidth, throughput, delay, latency, jitter, data loss and other errors, etc.). The telemetry subsystem 210 can also generate reports from the network traffic data for presentation (e.g., via the user interface subsystem 206) to end users.

In some embodiments, the telemetry subsystem 210 can also collect other information relating to the devices in a network, such as device information (e.g., host name, network address, operating system, CPU usage, disk space, ports, logged users, scheduled jobs, open files, and information regarding files and/or directories stored by a device); application or process information for an application or process generating a particular, packet, flow, or session (e.g., application or process name, identifier, parent process identifier, directory path, CPU utilization, memory utilization, memory address, scheduling information, nice value, flags, priority, status, start time, terminal type, CPU time taken by the application or process, owner, etc.); user information for a user of a device and/or an application or process (e.g., user name, user numeric identifier, user's real name, e-mail address, user's groups, permissions, etc.); virtualization information (e.g., virtual machine (VM) or container orchestration platform and version or build number, configuration information, physical host information, VM or container information, a list of running VMs or containers, tenant user information, etc.); and other device-specific data capable of being captured by the device (e.g., audio if the device includes a microphone, video if the device includes a camera, temperature if the device is a thermostat, etc.).

The AAA subsystem 212 can control access to computer resources, enforce network policies, audit usage, and provide information necessary to bill for services. The AAA subsystem can interact with network access and gateway devices and with databases and directories containing information for IoT devices, end users, policies, billing, and similar information (e.g., to provide authentication, authorization, and accounting services. In some embodiments, the AAA subsystem 212 can utilize Remote Authentication Dial-In User Service (RADIUS) or Diameter to communicate with devices and applications. In some implementations, the Cisco® Identity Services Engine (ISE) can operate as the AAA subsystem 212 and/or the AAA subsystem can be implemented using Cisco® Application Visibility and Control (AVC).

The MUD controller 214 can operate as an interface between the network controller 200 and a device manufacturer's registration system (e.g., the device registration system 142) for registering a device and identifying the types of access the device may need to operate. The process registration may be initiated by an IoT device (e.g., the IoT device 134) or a client device (e.g., the client device 136) registering the IoT device on behalf of the IoT device. For example, in some embodiments, the client device may be a mobile device (e.g., tablet computer, smart phone, smart glasses, etc.) including software (e.g., web browser, mobile app, etc.) for accessing the user interface subsystem 206 or other component of the network controller 200. The software executing on the client device can include a function or feature for capturing the IoT device's serial number, Media Access Control (MAC) address, or other unique identifying information. The unique identifying information may be human-readable or encoded in a machine-readable format (e.g., a Quick Response code (QR Code®) or other matrix bar code, a linear or one-dimensional bar code, etc.). The client device can invoke the registration process on behalf of the IoT device by scanning in the IoT device's unique identifying information. The registration process is discussed further below with respect to FIG. 3.

The monitoring and remediation subsystem 216 can track the status and health of IoT devices to determine whether they are functional and operating within ranges of expected measurements (e.g., upload bandwidth/throughput, download bandwidth/throughput, connection rate, etc.) and behaviors (e.g., no payload anomalies; viruses; protocol anomalies, such as MAC/IP address spoofing, duplicate MAC/IP addresses, TCP/IP or UDP fan out, etc.; geographic anomalies (e.g., unusual traffic from certain geographic regions); temporal anomalies (e.g., unusual traffic during certain parts of the day, week, month, year, etc.); user anomalies (e.g., unusual traffic from certain users); etc.). When the monitoring and remediation subsystem 216 detects that a device may be behaving anomalously or outside ranges of expected measurements, the subsystem can update a flag or a state of the device indicating the device may require troubleshooting and/or add the device to a remediation interface for further evaluation and possible resolutions as discussed further below.

The monitoring and remediation subsystem 216 can utilize various techniques for identifying devices that perform outside of specified measurement boundaries or that behave anomalously from standard behavior. In some embodiments, an end user can manually place devices into a remediation interface or otherwise mark devices for remediation. For example, the end user may operate a client device connected to the user interface subsystem 206 to search for and/or filter devices by device name, device type, manufacturer, model, network address or network address range, physical location, device owner, tuple information, and so forth, and select devices for migration to the remediation interface.

Alternatively or in addition, the monitoring and remediation subsystem 216 may evaluate network access and security policies or rules for assigning devices to the remediation interface for any failed access attempts or when the devices exceed a specified number of failed access attempts over any time period or over a specified time period. The rules may be defined by an end user and/or automatically defined by and/or derived from the network controller 200; device manufacturers (e.g., via a MUD profile as discussed further below); industry standards groups; vulnerability databases (e.g., Open Source Vulnerability Database (OSVDB), National Vulnerability Database (NVD), Cisco® Vulnerability Database, etc.); DNS, IP address, and MAC address blacklists (e.g., Cisco Talos™ Reputation Center, SpamCop® Blocking List, Spam and Open Relay Blocking System (SORBS), etc.), and other security authorities. The network access and security policies and rules can comprise access control lists (ACLs), security group rules, firewall rules, and the like. Network access and security policies or rules can include whitelist rules (e.g., policies that deny access by default and allow access only if a policy exists to permit the access) and/or blacklist rules (e.g., policies that permit access by default unless a policy exists to prohibit the access).

The monitoring and remediation subsystem 216 may also enact application-based policies for how a specific application, class of applications, or classes of applications can operate in a network, such as rules prohibiting certain applications or websites (e.g., Telnet, BitTorrent, games, social networking, etc.); quality of service (QoS) or quality of experience (QoE) rules; rules regarding average, minimum, and/or maximum network traffic volume, throughput (or change in throughput), latency, jitter, packet loss, and other errors; and rules regarding application performance (e.g., average, minimum, and/or maximum load, response times, CPU usage, memory usage, disk usage, etc.).

The monitoring and remediation subsystem 216 may also deploy device-based policies for a specific type of device, class of devices, or classes of devices, such as rules relating to operational time periods, including wakeup intervals, expected operation only during business hours, regularly scheduled uploads/downloads, and so forth; operational ranges for network, application/process, and/or device performance (e.g., acceptable or unacceptable ranges for bandwidth, throughput, latency, jitter, packet loss, error, load, response times, computing resource usage, etc.); operational temperature ranges (including ambient temperature or device temperature); operational air quality measures (e.g., acceptable or unacceptable amounts of smoke, carbon monoxide, etc.); operational power ranges (including battery levels); device states (e.g., open/closed or locked/unlocked state for doors, windows, physical locks, etc., which can be absolute states or states lasting for a specified duration and/or states occurring within a particular time of day); and other device-specific information discussed throughout the present disclosure.

In some embodiments, the monitoring and remediation subsystem 216 may utilize machine learning for identifying devices not operating within specified ranges of measurements or acting in an anomalous manner. At a high level, machine learning can involve collecting features (e.g., qualities or characteristics of an object that can define the object in part and may be used to compare the similarities or differences between objects) of data samples or data instances (e.g., IoT devices), building feature vectors or other data structure representations for the data samples or data instances, and applying the feature vector representations to a machine learning model or algorithm to solve problems that may otherwise be intractable for humans to solve, such as determining clusters or classes to which IoT devices belong (e.g., compromised device cluster or class, uncompromised device cluster or class, or a cluster or class somewhere in between these possible states).

Machine learning algorithms can include unsupervised or supervised methods. In unsupervised learning, the input data set may not be pre-labeled, and the monitoring and remediation subsystem 216 can apply the input data set to a machine learning algorithm to learn how devices may be similar to one another and the features that may be especially cogent for distinguishing similarities and differences among the devices. Some examples of unsupervised learning techniques include k-means clustering, hierarchical clustering, density-based clustering, and grid-based clustering, among others.

In k-means clustering, a number of n data points (e.g., devices) are partitioned into k clusters such that each point belongs to a cluster with the nearest mean. The algorithm proceeds by alternating steps, assignment and update. During assignment, each point is assigned to a cluster whose mean yields the least within-cluster sum of squares (WCSS) (e.g., the nearest mean). During update, the new means is calculated to be the centroids of the points in the new clusters. Convergence is achieved when the assignments no longer change. One variation of k-means clustering dynamically adjusts the number of clusters by merging and splitting clusters according to predefined thresholds. The new k is used as the expected number of clusters for the next iteration (e.g., Iterative Self-Organizing Data Analysis Technique (ISODATA)). Another variation of k-means clustering uses real data points (medoids) as the cluster centers (e.g., Partitioning Around Medoids (PAM)).

Hierarchical clustering methods sort data into a hierarchical structure (e.g., tree, weighted graph, etc.) based on a similarity measure. Hierarchical clustering can be categorized as divisive or agglomerate. Divisive hierarchical clustering involves splitting or decomposing "central" nodes of the hierarchical structure where the measure of "centrality" can be based on "degree" centrality, (e.g., a node having the most number of edges incident on the node or the most number of edges to and/or from the node), "betweenness" centrality (e.g., a node operating the most number of times as a bridge along the shortest path between two nodes), "closeness" centrality (e.g., a node having the minimum average length of the shortest path between the node and all other nodes of the graph), among others (e.g., Eigenvector centrality, percolation centrality, cross-clique centrality, Freeman centrality, etc.). Agglomerative clustering takes an opposite approach from divisive hierarchical clustering. Instead of beginning from the top of the hierarchy to the bottom, agglomerative clustering traverses the hierarchy from the bottom to the top. In such an approach, clustering may be initiated with individual nodes and gradually combine nodes or groups of nodes together to form larger clusters. Certain measures of the quality of the cluster determine the nodes to group together at each iteration. A common measure of such quality is graph modularity.

Density-based clustering is premised on the idea that data points are distributed according to a limited number of probability distributions that can be derived from certain density functions (e.g., multivariate Gaussian, t-distribution, or variations) that may differ only in parameters. If the distributions are known, finding the clusters of a data set becomes a matter of estimating the parameters of a finite set of underlying models. Expectation maximization (EM) is an example of density-based clustering, and can involve multiple iterations for finding the maximum likelihood or maximum a posteriori estimates of parameters in a statistical model, where the model depends on unobserved latent variables. The EM iteration alternates between performing an expectation (E) step, which creates a function for the expectation of the log-likelihood evaluated using the current estimate for the parameters, and a maximization (M) step, which computes parameters for maximizing the expected log-likelihood found during the E step. These parameter-estimates are then used to determine the distribution of the latent variables in the next E step.

Grid-based clustering divides a data space into a set of cells or cubes by a grid. This structure is then used as a basis for determining the final data partitioning. Examples of grid-based clustering include Wave Clustering and Statistical Information Grid (STING). Wave clustering fits the data space onto a multi-dimensional grid, transforms the grid by applying wavelet transformations, and identifies dense regions in the transformed data space. STING divides a data space into rectangular cells and computes various features for each cell (e.g., mean, maximum value, minimum value, etc.). Features of higher level cells are computed from lower level cells. Dense clusters can be identified based on count and cell size information.

Supervised learning methods operate on pre-labeled data. The monitoring and remediation subsystem 216 can acquire the pre-labeled data, classified according to predetermined criteria, to learn the model (e.g., extrapolate the features and feature values) for mapping new unclassified devices to one or more classifications. Some examples of supervised learning algorithms include k-nearest neighbor (a variation of the k-means clustering algorithm discussed above), Naïve Bayesian classifiers, boosting, perceptrons and neural networks, decision trees and random forests, and support vector machines (SVMs), among others.

Naïve Bayesian classifiers are a family of probabilistic classifiers based on Bayes' theorem with strong assumption of independence among features. Bayes' theorem posits that the probability of x given that z already exists or has occurred equals the probability of x and z happening together divided by the probability of z. Formally, this can be referred to as the posterior probability density function p(x|z):

$$p(x|z)=(p(z|x)p(x))/p(z), \quad \text{(Equation 1)}$$

The optimization criterion of Bayes, minimum risk or maximum posterior expectation, is applicable when it is possible to quantify cost if estimates differ from true parameters and the expectation of the cost is acceptable as an optimization criterion. Cost function C(x|x): $\mathbb{R}^M \to \mathbb{R}^N$ can represent a true cost. However, it may be difficult to quantify cost accurately and it is oftentimes more practical to select a cost function whose mathematical treatment is not overly complex and to assume that the cost function depends on the difference between the estimated and true parameters, such as by computing the estimation error $e=\hat{x}-x$. Given these assumptions, some embodiments may utilize the minimum means square error (MMSE) estimator as a Bayesian estimator. MMSE can be formally defined as:

$$\hat{x}_{MMSE}z=E[x|z]=\int_x xp(x|z)dx \quad \text{(Equation 2)}$$

Other embodiments may utilize the maximum a posteriori (MAP) estimator as the Bayesian estimator. MAP can be defined as:

$$\hat{x}_{MAP}z = \text{argmax}_x \left\{ \frac{p(z|x)p(x)}{p(x)} \right\} = \text{argmax}_x \{p(z|x)p(x)\} \quad \text{(Equation 3)}$$

Still other embodiments may utilize maximum likelihood estimation (MLE). MLE is based on the observation that in MAP estimation, the peak of p(z|x) is when p(x) is almost constant. This can be especially true if little prior knowledge is available. In these cases, the prior density p(x) does not affect the position of the maximum very much. Discarding p(x) and maximizing the function p(z|x) leads to the MLE:

$$\hat{x}_{MLE}z=\text{argmax}_x\{p(z|x)\} \quad \text{(Equation 4)}$$

Boosting methods attempt to identify a highly accurate hypothesis (e.g., classifier having a low error rate) from a combination of many "weak" hypotheses (e.g., classifiers having substantial error rates). Given a data set comprising samples (e.g., devices) within a class and not within the class and weights based on the difficulty of classifying a sample and a weak set of classifiers, boosting generates and calls a new weak classifier in each of a series of rounds. For each call, the distribution of weights is updated to reflect the importance of samples in the data set for the classification. On each round, the weights of each incorrectly classified sample are increased, and the weights of each correctly classified example is decreased so the new classifier may focus on the difficult samples (e.g., those samples that have not been correctly classified). Example implementations of boosting include Adaptive Boosting (AdaBoost), Gradient Tree Boosting, or XGBoost.

Neural networks are inspired by biological neural networks and comprise an interconnected group of functions or classifiers (e.g., perceptrons) that process information using a connectionist approach. Neural networks change their structure during training, such as by merging overlapping detections within one network and training an arbitration network to combine the results from different networks. Some examples of neural network algorithms include the multilayer neural network, the auto associative neural network, the probabilistic decision-based neural network (PDBNN), and the sparse network of winnows (SNOW).

Decision trees use a tree-like graph or model of decisions and their possible consequences. Internal nodes can represent tests on features, branches can represent outcomes of the tests, and leaf nodes can represent a class label. A data sample (e.g., a device) can be walked through the decision tree from root to leaf, and the label of the leaf node is the class for data sample. Some examples of decision tree algorithms include Classification and Regress Trees (CART), Iterative Dichotomiser 3 (ID3), C4.5, and RepTree.

Random forests rely on a combination of decision trees in which each tree depends on the values of a random vector sampled independently and with the same distribution for all trees in the forest. A random forest can be trained for some number of trees t by sampling n cases of the training data at random with replacement to create a subset of the training data. At each node, a number m of the features are selected at random from the set of all features. The feature that provides the best split is used to do a binary split on that node. At the next node, another number m of the features are selected at random and the process is repeated.

SVMs involve plotting data points in n-dimensional space (where n is the number of features of the data points) and identifying the hyper-plane that differentiates classes and maximizes the distances between the data points of the classes (referred to as the margin).

The monitoring and remediation subsystem 216 can generate machine learning models from various sources, including MUD profiles or similar information from device manufacturers, data samples from a single private network, data samples from multiple customer networks, public data sources, and so forth.

The data subsystem 220 can include any data or information, such as management data, statistics, settings, preferences, profile data, logs, notifications, attributes, configuration parameters, endpoint information, network information, and so forth. For example, the network controller 200 can collect network traffic data and other information from managed devices and store this information as part of the data subsystem 220. The data subsystem 220 may also include performance and/or configuration information, and the network controller 200 can use the data subsystem 220 to perform management or service operations for endpoints. The data subsystem 220 may be stored on a storage or memory device on the network controller 200, a separate storage device connected to the network controller 200, or a remote storage device in communication with the network controller 200.

In some embodiments, the data subsystem 220 can integrate data from heterogeneous data streams to provide access to all of the integrated data and to support different modes of access, such as by deploying a data lake, an enterprise data warehouse (EDW), a hybrid data architecture including an EDW and a data lake, a data virtualization architecture, or other multi-model data architecture. The data subsystem 220 can provide optimized views (e.g., data marts, operational data stores, analytic sandboxes, etc.) into the integrated data to support the services of the IoT management system. An EDW is a centralized, enterprise-wide repository comprising historical and current data from enterprise systems. An EDW can be used by business intelligence systems to run various analytical queries, and the EDW can interface with an Online Analytical Processing (OLAP) system to support multi-dimensional analytical queries. A data lake is a large data storage repository that holds a vast amount (e.g., substantially all or all of the data flowing through the network) in its native format until it is needed. A data lake is polymorphous and can include various types of databases or data stores, such as relational databases, key-value stores, document databases, graph databases, column-family databases, object store, file systems, and so forth. A data lake can store data having various structures, including structured data, semi-structured data, and unstructured data. A data lake can also store data in separate physical locations, such as on-premises (e.g., on enterprise-owned or leased property) or off-premises (e.g., within a public cloud) or in memory, disk, tape, or other suitable medium. An EDW and a data lake can be separate complementary storage systems, but a data lake can also incorporate an EDW in some deployments.

In this example, the data subsystem can comprise an IoT device data store 222, a policy data store 224, a telemetry data store 226, and a remediation data store 228. The IoT device data store 222 can store information regarding managed IoT devices, such as an IoT device's name, IP address, MAC address, device type, manufacturer, model, serial number, timestamp of when the device was first detected by the network controller 200, timestamp of when the device was last detected by the network, description, metadata tags, operating system, user, VLAN, geofencing status, and so forth. The policy data store 224 can store network security policies, application policies, device policies, and other rules for managing IoT devices. The policies and rules may be defined by an end user, the network controller 200, a device manufacturer, an industry standards group, a security service provider, and/or other authority. The telemetry data store 226 can store data captured by the telemetry subsystem 210, including network traffic data at various levels of granularity (e.g., packet data, flow data, connection data, session data, etc.) as well as computed statistical information (e.g., bandwidth, throughput, latency, jitter, packet loss, etc.); device and/or application/process data (e.g., CPU usage, memory usage, virtual memory usage, disk space usage, power usage, start time, duration, etc., on a per IoT device basis and/or on a per application/process basis for each IoT device); and/or other device-specific measurement data (e.g., temperature, biotelemetry, motion, etc.). The remediation data store 228 can store data relating to remediation for IoT devices, such as remediation history, device profile information, remediation actions, and so forth.

Figure 3:
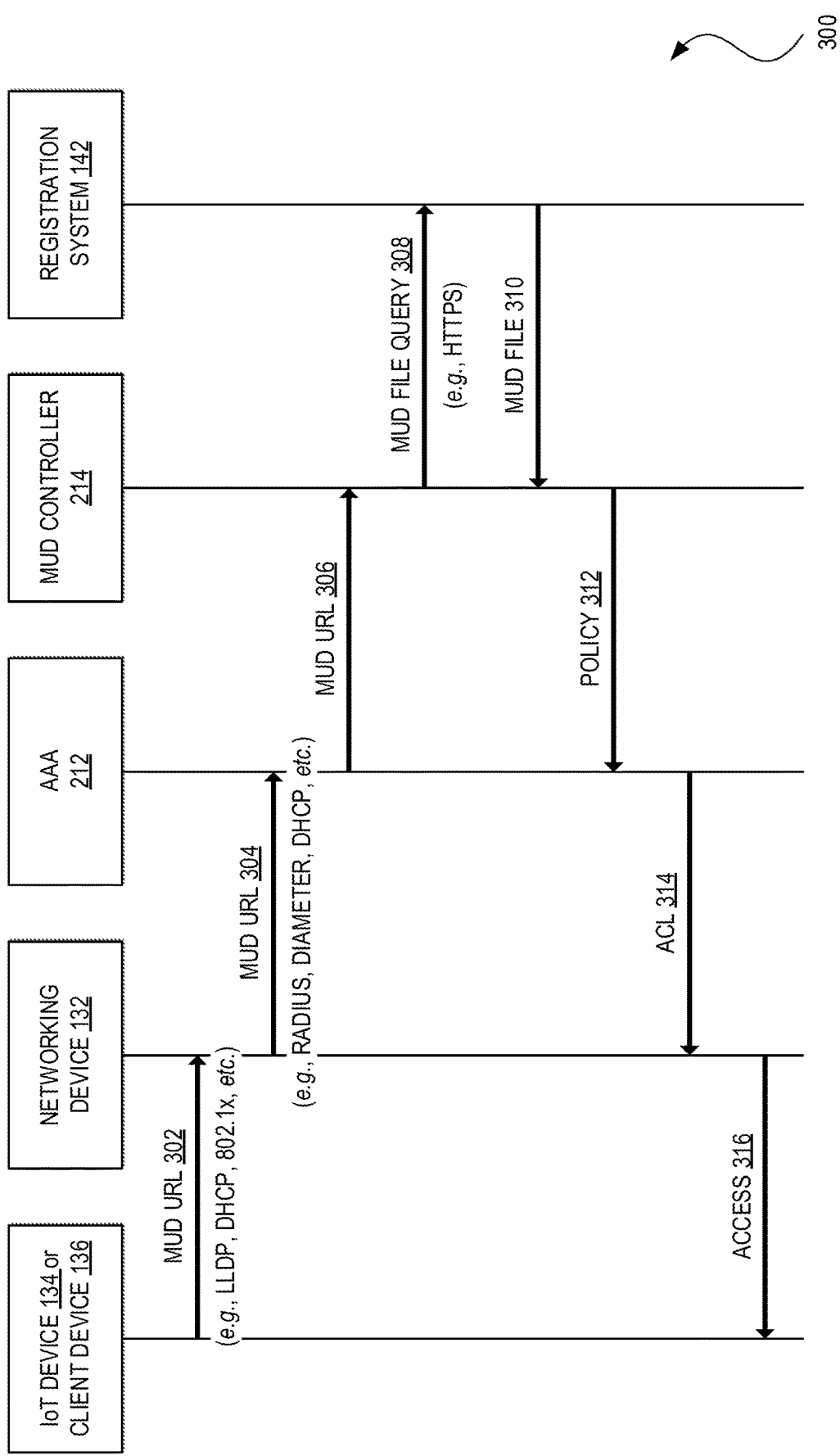
FIG. 3 illustrates an example of a flow diagram of a process for registering an IoT device to an IoT management system in accordance with an embodiment.

FIG. 3 illustrates an example of flow diagram of a process 300 for registering an IoT device (e.g., the IoT device 134) to an IoT management system (e.g., the IoT management system 116). One of ordinary skill will understood that, for any processes discussed herein, there can be additional, fewer, or alternative steps performed in similar or alternative orders, or in parallel, within the scope of the various embodiments unless otherwise stated. The process 300 may be performed by an IoT device (e.g., the IoT device 134) or a client device (e.g., the client device 136) registering the IoT device 134 on behalf of the IoT device to the IoT management system 116.

The process 300 may begin with the IoT device initiating a connection to a networking device (e.g., the networking device 132) of an IoT network (e.g., the IoT cloud 130) for the first time or after a specified period of inactivity (e.g., a Dynamic Host Configuration Protocol (DHCP) lease time). The IoT device 134 or the client device 136 can transmit a request 302 (e.g., Link Layer Discovery Protocol (LLDP), Dynamic Host Configuration Protocol (DHCP), 802.1x, etc.) including a MUD uniform request locator (URL).

The process 300 may continue with the networking device 132 extracting the URL, encapsulating the URL in a request 304 (e.g., RADIUS, Diameter, etc.), and transmitting the request 304 to an AAA server (e.g., the AAA subsystem 212). In other embodiments in which the MUD URL may be embedded in a DHCP request, the networking device 132 may instead forward the DHCP request to the AAA subsystem 212.

After receiving the request 304, the AAA subsystem 212 can transmit a request 306 including the URL to a MUD controller (e.g., the MUD controller 214). In some embodiments, the MUD controller may be integrated with the AAA subsystem 212. The MUD controller 214 may transmit a query 308 (e.g., Hypertext Transfer Protocol Secure (HTTPS)) to a device registration system (e.g., the device registration system 142) for a MUD file 310 corresponding to the IoT device 134. In some implementations, the device registration system 142 may include a file server located at the URL for hosting MUD files for the devices of the manufacturer of the IoT device 134, including the MUD file 310.

After verifying that the MUD file 310 was produced by the device manufacturer, the mud controller 214 can retrieve the MUD file 310 from the device registration system 142. In some implementations, the MUD file can be a Yet Another Next Generation (YANG) data model encoded in JavaScript® Notation (JSON) and containing an abstract intent for the IoT device 134.

The MUD controller 214 can translate the abstract intent to a context-specific policy 312, and transmit the policy 312 to the AAA subsystem 212. The AAA subsystem 212 can enforce the policy 312 within the IoT cloud 130, such as by defining and imposing port-based ACLs 314 for the interfaces between the networking device 132 and the IoT device 134. The process 300 may conclude with the networking device 132 providing access 316 to the IoT cloud 130 based on the device manufacturer's intent.

FIGS. 4A-4E illustrate examples of graphical user interfaces for a client application executing on a client device (e.g., the client device 136) that is in communication with an IoT management system (e.g., the IoT management system 116). Although FIGS. 4A-4E show the client application to be a mobile application (e.g., an "app" for a tablet computer, a smart phone, wearable device, or other small form-factor general purpose computing device), the principles disclosed in the present disclosure are widely applicable to client devices of other form factors, including servers, desktops, laptops, televisions, set top boxes, IoT devices, and other computing devices capable of connecting to a WAN (e.g., the WAN 112) and including input/output components to enable an end user to interact with the IoT management system. One of ordinary skill will also understand that the graphical user interfaces of FIGS. 4A-4E are but one example of a user interface for remediating IoT devices. Other embodiments may include a fewer number or a greater number of elements.

FIG. 4A illustrates an example of a graphical user interface 400A for a client application of an IoT management system. For example, the graphical user interface 400A can be a home screen or homepage of the client application or the first screen or first webpage displayed to an end user following a login screen or webpage. Alternatively in or addition, the graphical user interface 400A can represent a list view of IoT devices managed by the IoT management system. In this example, the graphical user interface 400A may include an application menu 402, a search tool 404, a sorting and filtering tool 406, and a plurality of list items representing IoT devices in a network (e.g., the IoT cloud 130) managed by the IoT management system, with each list item 408 representing an individual IoT device. As will be appreciated by one of ordinary skill in the art, the client application can also provide various interface elements (e.g., scroll bars) or support various inputs (e.g., swipe gestures) for navigating the IoT device list if the number of list items is greater than what can fit within the display of the client device.

The application menu 402 can enable the end user to navigate through different screens or webpages of the client application, and can include a home button, a button for a list of IoT devices managed by the IoT management system, a resolve button for a remediation user interface for managing IoT devices exhibiting anomalies, an alert button for managing alerts received by the IoT management system, and a scan button to register new IoT devices to the IoT management system.

The search tool 404 can enable the end user to query an IoT device data store (e.g., the IoT device data store 222) based on various metadata fields or characteristics of IoT devices managed by the IoT management system, such as querying by device name, device owner, serial number, device type, manufacturer, model, MAC address, IP address, physical location, current status, remediation status, and so forth.

The sorting and filtering tool 406 can enable the end user to sort the order (e.g., natural order or reverse order) of the IoT devices presented in the list view of the graphical user interface 400A, including sorting the IoT devices alphabetically, such as by device name, device owner, device type, manufacturer, model, physical location, status, and other alphabetic characteristics associated with an IoT device; numerically, such as by MAC address, IP address, connection score, security score, upload bandwidth, upload throughput, download bandwidth, download throughput, number of alerts, number of policies, number of connections, and other numeric characteristics associated with an IoT device; and/or temporally, such as by a time an IoT device was placed in a remediation interface, a time the IoT device was last detected by the IoT management system, a time the IoT first registered with the IoT management system, or other temporal characteristics associated with an IoT device; among other sorting methods. The sorting and filtering tool 406 can also enable the end user to filter (e.g., display only IoT devices that possess a particular characteristic and/or exclude from display IoT devices that do not possess a particular characteristic) the IoT devices presented in the list view of the graphical user interface 400A.

Each list item 408 of the list view of the graphical user interface 400A can represent an IoT device managed by the IoT management system. In this example, each list item 408 can include a device name 410, a device alert state 412, a connection score 414, a security score 416, an upload traffic indicator 418, and a download traffic indicator 420. The device alert state 412 can indicate that the IoT device exhibits one or more anomalies and has been or should be added to a remediation interface or otherwise flagged for remediation. Here, the alert state 412 can also include a numeric indicator representing a number of alerts associated with the IoT device.

The connection score 414 can indicate the network connection strength of the IoT device. Here, the connection score can be a number between 0 and 100 to indicate the connection strength. For example, the IoT management system can measure the connection strength by WiFi signal strength or other wireless technology signal strength. The security score 416 can indicate the security strength of the IoT device. Here, the security score can be a number between 0 and 20 to indicate the security strength. In some embodiments, the IoT management system can use a machine learning subsystem (e.g., the monitoring and remediation subsystem 216) to compute the security score 416.

The upload traffic indicator 418 can represent multiple dimensions of upload network traffic of the IoT device. In some embodiments, the length of the upload traffic indicator 418 can represent a relative size or volume of traffic (in, e.g., Mb, MB, Gb, GB, Tb, TB, etc.) uploaded by the IoT device over a specified time period (e.g., past hour, past 8 hours, day, week, month, etc.). For example, the length of the bar can be a ratio between the current traffic volume of the IoT device and maximum traffic volume. In some cases, the length of the upload traffic indicator 418A can be relative to a maximum traffic limit as set forth by a network policy, application policy, device policy, user policy, MUD profile or other device profile information, and so forth. In other cases, the length of the upload traffic indicator 418 can be relative to a historical maximum traffic volume uploaded by a specific IoT device or type of IoT device over a specified time period. In still other cases, the length of the upload traffic indicator 418 can be relative to a maximum traffic volume uploaded by any device in the network.

In some embodiments, the color or shade of the upload traffic indicator 418 can represent another dimension of the upload traffic of the IoT device, such as an instantaneous upload throughput of the IoT device or an average upload throughput over a specified time period (e.g., Mb/s, Gb/s, etc.). For instance, Table 1 sets forth example values and a color or shade scheme used for the upload traffic indicator 418A when the μ-value (e.g., mean, median, mode, or expected value) of the instantaneous upload throughput is 4 Mb/s and the standard deviation $\sigma_1$ is 1 Mb/s, and the μ-value of the average upload throughput is 2.5 Mb/s and the standard deviation $\sigma_2$ is 0.5 Mb/s. In other embodiments, the color or shade of the upload traffic indicator 418 can represent a change in the instantaneous upload throughput or average upload throughput over a specified time period (e.g., $Mb/s^2$, $Gb/s^2$, etc.). In still other embodiments, other visual indicators may be used to represent throughput (or changes in throughput) or other temporal traffic metrics as discussed throughout the present disclosure.

TABLE 1

Example Values for Throughput

| Time Elapsed (s) | Traffic Volume (Mb) (Total) | Inst. Throughput (Mb/s) | Avg. Throughput (Mb/s) | $\sigma_1$ | $\sigma_2$ | Color or Shade |
|---|---|---|---|---|---|---|
| 0 | 0 | 0 | 0 | — | — | — |
| 1 | 1 (1) | 1 | 1 | −3 | −3 | Blue (0x0000FF) |
| 2 | 2 (3) | 2 | 1.5 | −2 | −2 | LightSkyBlue (0x87CEFA) |

TABLE 1-continued

Example Values for Throughput

| Time Elapsed (s) | Traffic Volume (Mb) (Total) | Inst. Throughput (Mb/s) | Avg. Throughput (Mb/s) | $\sigma_1$ | $\sigma_2$ | Color or Shade |
|---|---|---|---|---|---|---|
| 3 | 3 (6) | 3 | 2 | −1 | −1 | Gray (0x666666) |
| 4 | 4 (10) | 4 | 2.5 | 0 | 0 | Gray (0x666666) |
| 5 | 5 (15) | 5 | 3 | +1 | +1 | Gray (0x666666) |
| 6 | 6 (21) | 6 | 3.5 | +2 | +2 | LightPink (0xFFB6C1) |
| 7 | 7 (28) | 7 | 4 | +3 | +3 | Red (0xFF0000) |

In the example of Table 1, blue can represent throughput (or change in throughput) values that are three or more standard deviations less than the μ-value of historical throughputs (or other temporal network traffic metric) (e.g., current throughput≤−3σ), light blue can represent throughput values that are between three and two standard deviations less than the μ-value of historical throughputs (e.g., −3σ<current throughput≤−2σ), gray can represent throughput values that are within two standard deviations from the μ-value of historical throughputs (e.g., −2σ<current throughput<+2σ), pink can represent throughput values that are between two and three standard deviations greater than the μ-value of historical throughputs (e.g., +2σ≤current throughput<+3σ), and red can represent throughput values that are three or more standard deviations greater than the μ-value of historical throughputs (e.g., current throughput≥+3σ). In other embodiments, only throughput values above or below a specified threshold (e.g., three or more standard deviations less than or greater than the μ-value of historical throughputs or current throughput≤−3σ and current throughput≥+3σ) may be represented in different colors or shades (e.g., light blue and pink, respectively) and a neutral color (e.g., gray) can represent throughput values within the specified threshold (e.g., within three standard deviations of the μ-value of historical throughputs or −3σ<current throughput<+3σ). In still other embodiments, different color or shade schemes may be utilized to represent the current upload throughput of the IoT device with respect to the number of standard deviations σ from the μ-value of historical throughputs (or other temporal traffic metric), such as a different color or shade for each standard deviation (e.g., −3σ, −2σ, −1σ, 0, +1σ, +2σ, +3σ, etc.) or different colors or shades for different ranges of standard deviations (e.g., between −3σ and −1σ, between +1σ and +3σ, etc.)

The download traffic indicator 420 can represent multiple dimensions of download network traffic of the IoT device. For example, like the upload traffic indicator 418, the length of the download traffic indicator 420 can represent a relative size or volume of traffic downloaded by the IoT device over a specified time period and the color or shade of the download traffic indicator 420 can represent the download throughput (or the change in download throughput). In some embodiments, the lengths of the upload traffic indicator 418 and the download traffic indicator 420 may be relative to one another. For example, if the maximum upload throughput of the IoT device is 4 Mb/s and the maximum download throughput of the IoT device is 8 Mb/s, then the length of the upload traffic indicator 418A may be no greater than half the length of the download traffic indicator 420A at any time. In other embodiments, the lengths of the upload traffic indicator 418A and the download traffic indicator 420A may be relative to a maximum upload traffic volume and a maximum download traffic volume, respectively. For example, if the current upload throughput of the IoT device is 2 Mb/s and the maximum upload throughput of the IoT device is 4 Mb/s, and the current download throughput of the IoT device is 4 Mb/s and the maximum download throughput of the IoT device is 8 Mb/s, then the lengths of the upload traffic indicator 418 and the download traffic indicator 420 may be the same or similar (e.g., approximately half-length).

Each list item 408 can also include a detailed view selection user interface element 422 to indicate to the end user that the end user can select (e.g., via a virtual or physical pointer) the list item 408 for a detailed view of the IoT device.

Figure 4B:
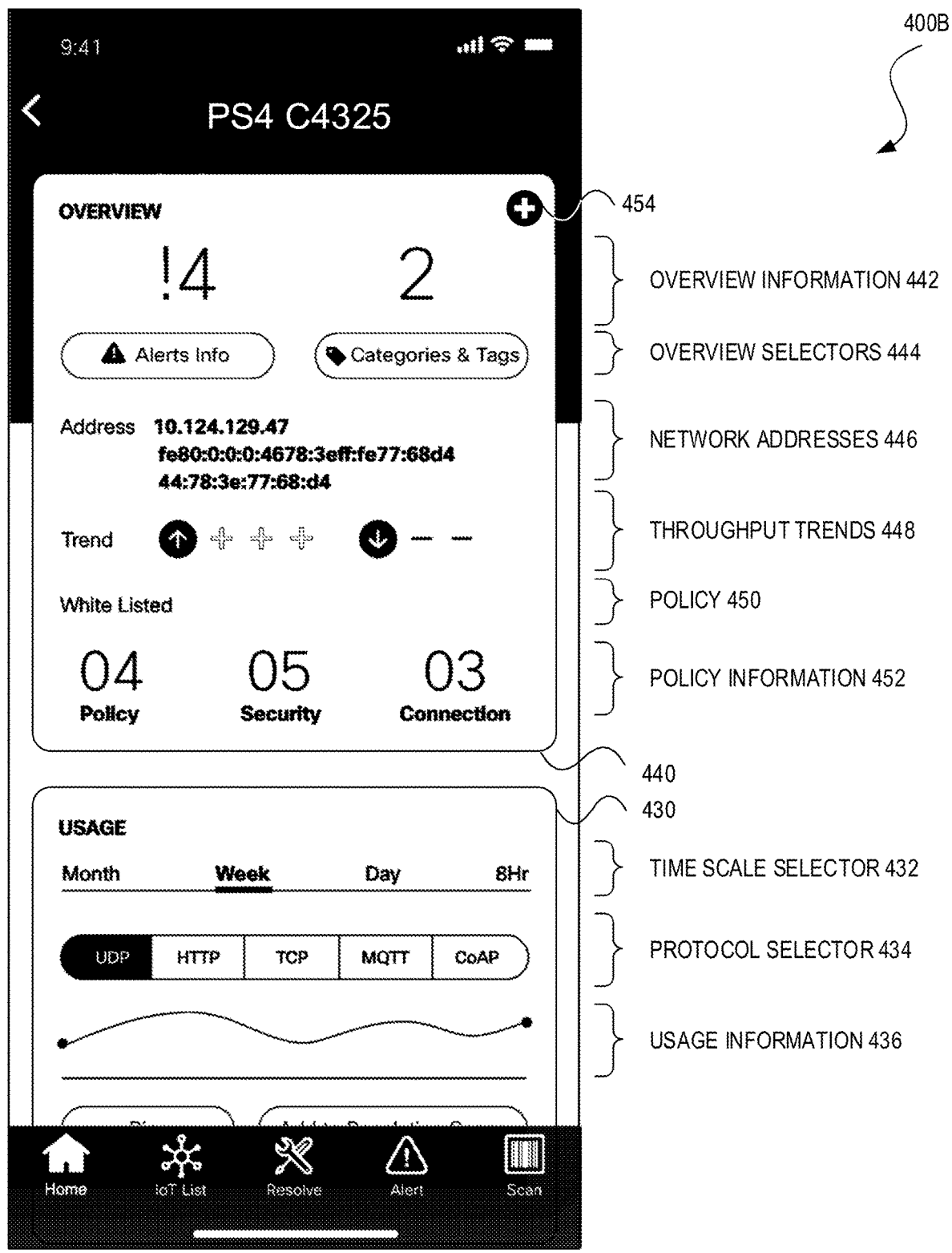

FIG. 4B illustrates an example of a graphical user interface 400B for a client application of an IoT management system. For example, the graphical user interface 400B can represent a detailed view of an IoT device managed by the IoT management system. The graphical user interface 400B can include one or more views, panes, tiles, cards, containers, widgets, or other user interface elements. In this example, the graphical user interface 400B can include a network usage user interface element 430 and an overview user interface element 440. The network usage user interface element 430 can provide information regarding network traffic volume or usage by the IoT device, and may include a time scale selection user interface element 432, a protocol selection user interface element 434, and a network usage graph 436. The time scale selection user interface element 432 can enable an end user to adjust the time scale (e.g., monthly, weekly daily, 8-hour period, etc.) at which network usage information is presented within the network usage user interface element 430. The protocol selection user interface element 434 can enable the end user to specify the protocol (e.g., UDP, HTTP, TCP, MQTT, CoAP, etc.) of the IoT device's traffic to be presented within the network usage user interface element 430. The usage information 436 can represent network usage (e.g., as a line graph) according to the time scale specified by the time scale selection user interface element 432 and the protocol specified by the protocol selection user interface element 434. In some embodiments, the usage information 436 can include real-time updates (e.g., updates occurring at a rate exceeding a minimum latency threshold or at a rate of little to no noticeable delay by a human) of network usage by the IoT device.

The overview user interface element 440 can comprise overview information 442, overview selection user interface elements 444, network addresses 446, throughput trend indicators 448, device policy 450, and policy information 452. The overview information 442 can indicate a number of alerts associated with the IoT device and the number of metadata tags, categories, labels, fields, characteristics, and so forth, attributed to the IoT device. The overview selection user interface elements 444 can enable the end user to drill down for more detailed information regarding the alerts and the metadata tags associated with the IoT device.

The network addresses 446 can include IP addresses (e.g., IPv4 and/or IPv6), MAC addresses (e.g., Extended Unique Identifier (EUI)-48 and/or EUI-64), and/or other unique identifying information of the IoT device (e.g., device name, serial number, etc.).

The throughput trend indicators 448 can represent current traffic trends for the IoT device. In this example, the throughput trend indicators 448 can denote that the current upload throughput is three or more standard deviations greater than the µ-value of historical upload throughputs (e.g., current upload throughput≥+3σ), and the current download throughput is two or more standard deviations less than the µ-value of historical download throughput (e.g., current download throughput≤−2σ). That is, the number of elements of the trend indicators 448 can correspond to the number of standard deviations σ of the current throughputs from the µ-value of historical throughputs. For example, three minus signs can indicate that the current upload throughput is three or more standard deviations less than the µ-value of historical throughputs (e.g., current throughput≤−3σ), two minus signs can indicate that the current throughput is between two and three standard deviations less than the µ-value of historical throughputs (e.g., −3σ<current throughput≥−2σ), one minus sign can indicate that the current throughput is between one and two standard deviations less than the µ-value of historical throughputs (e.g., −2σ<current throughput≤−1σ), a "0" can indicate that the current throughput is within one standard deviation less or greater than the µ-value of historical throughputs (e.g., −1σ<current throughput<+1σ), one plus sign can indicate that the current throughput is between one and two standard deviations greater than the µ-value of historical throughputs (e.g., +1σ≤current throughput<+2σ), two plus signs can indicate that the current throughput is between two and three standard deviations greater than the µ-value of historical throughputs (e.g., +2σ≤current upload throughput<+3σ), three plus signs can indicate that the current throughput is three or more standard deviations greater than the µ-value of historical throughputs (e.g., current throughput≥+3σ), and so forth.

In other embodiments, the number of elements of the trend indicators 448 can correspond to the number of standard deviations of other current temporal network traffic metrics from the µ-value of other historical temporal network traffic metrics, such as changes in upload and/or download throughputs (e.g., throughput per unit of time, such as Mb/s², MB/s², Gb/s², GB/s², etc.), latencies, jitter, data loss, errors, and other network traffic metrics relative to time. In still other embodiments, the number of elements of the trend indicators 448 can correspond to the number of standard deviations of current traffic volumes (e.g., Mb, MB, Gb, GB, Tb, TB, etc.) uploaded or downloaded by the IoT device in the aggregate over a specified time period (e.g., monthly, weekly daily, 8-hour period, etc.) from the µ-value of historical traffic volumes over the same or similar time period.

The device policy 450 can indicate the current network policy or policies applied to the IoT device, such as whether the IoT management system permits access to the network by the IoT device (e.g., "White Label" or "White Listed"); monitors the IoT device with an increased level of scrutiny, such as by capturing and storing the IoT device's traffic for further analysis (e.g., "Copy Snapshot"); temporarily blocks the IoT device from accessing the network (e.g., "Quarantined"); or permanently blocks the IoT device from accessing the network (e.g., "Black Listed"). The policy information 452 can include information regarding the number of application policies applicable to the IoT device, the number of network security policies applicable to the IoT device, and the current number of connections of the IoT device. In some embodiments, the overview user interface element 440 can also include user interface elements to enable the user to drill down for detailed information regarding application policies, network security policies, and connections associated with the IoT device.

In this example, the overview user interface element 440 can also include an add device for remediation selection user interface element 454 to enable an end user to manually add the IoT device to a remediation interface or otherwise mark the IoT device for remediation.

Figure 4C:
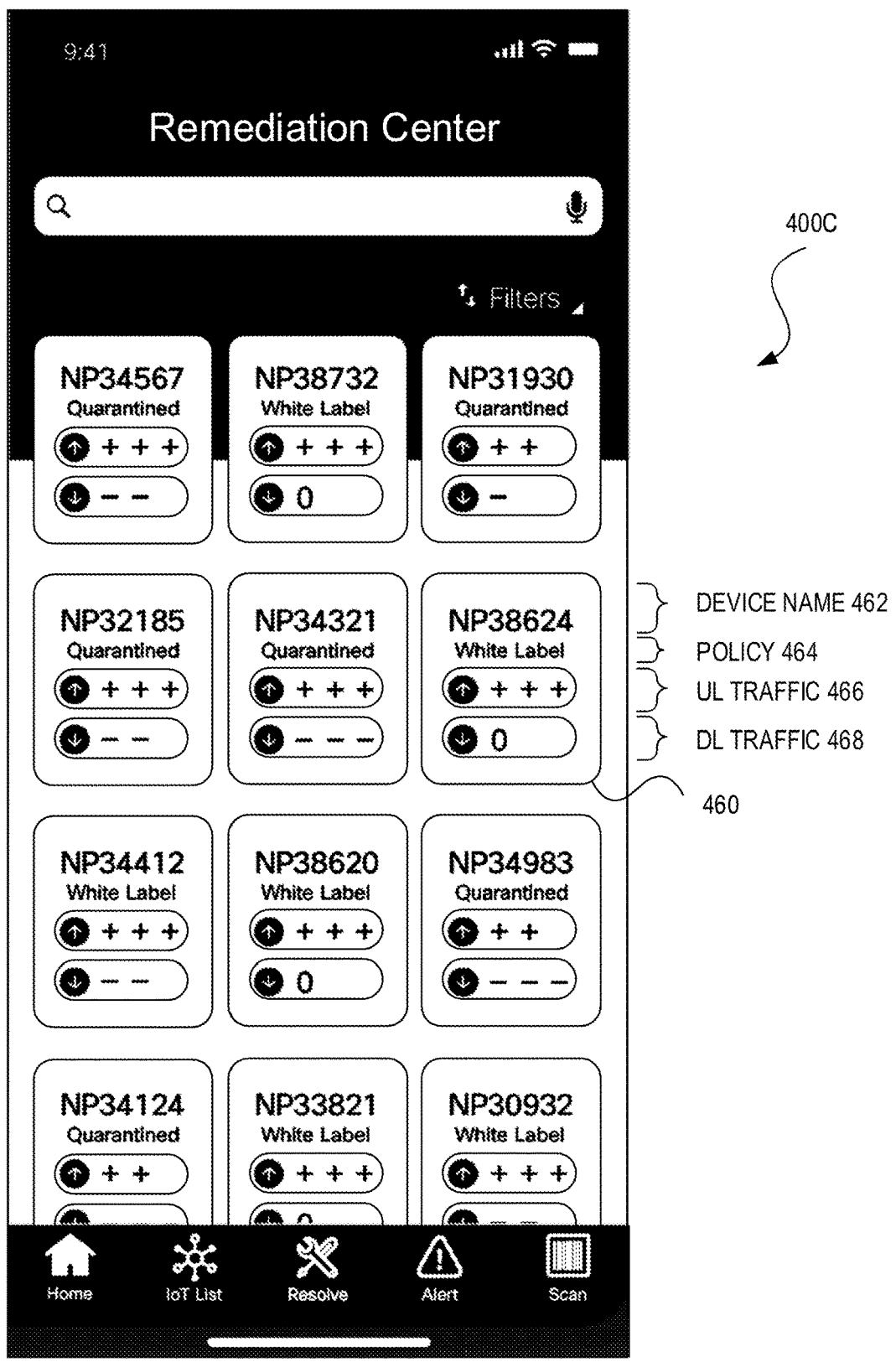

FIG. 4C illustrates an example of a graphical user interface 400C for the client application of the IoT management system. For example, the graphical user interface 400C can represent a remediation interface for managing IoT devices exhibiting anomalies, which the end user may navigate to by selecting the resolve button from the application menu 402. In this example, the graphical user interface 400C can include a search tool and a sorting and filtering tool that operate similarly to the search tool 404 and sorting and filtering tool 406, respectively, except limited to searching, sorting, and filtering on IoT devices exhibiting anomalies or otherwise flagged for remediation.

The graphical user interface 400C can include one or more views, panes, cards, containers, widgets, or other user interface elements, with each user interface element 460 representing an IoT device exhibiting one or more anomalies. Each IoT device user interface element 460 can include a device name 462, a device policy 464 (which can be similar to the device policy 450), and an upload traffic indicator 466 and a download traffic indicator 468 (which can be similar to the throughput trend indicators 448 or can represent the number of standard deviations of other current network traffic metrics from other historical network traffic metrics). In other embodiments, each user interface element 460 can include other information associated with a specific IoT device, such as network addresses, number of alerts, number of metadata tags, number of application policies, number of network security policies, number of connections, network usage information, and other device-specific information discussed throughout the present disclosure.

In some embodiments, each user interface element 460 can include one or more interactive elements. For example, in addition to indicating the current device policy applied to the IoT device, the device policy status 464 may also be selected (e.g., tapped, double tapped, long pressed, hovered over for a specified duration, clicked, right-clicked, etc.) to trigger a dialog box including one or more additional policies to alternatively apply to the IoT device represented by the user interface element 460. As another example, each of the upload throughput indicator 466 and the download throughput indicator 468 may be selectable, such as to throttle upload throughput or download throughput, respectively. In some embodiments, the user interface element 460 may have different behaviors depending on how the end user interacts with it. For example, a single tap or click of the user interface element 460 can navigate the end user to a detailed representation of the IoT device while a double tap, a long press, a hover gesture or input, a right click, and so forth, can trigger a dialog box including one or more user interface elements that may be selectable to perform a specific action relating to the IoT device (e.g., applying a different policy to the device, pinging the device, etc.).

In some embodiments, the graphical user interface 400C can also include one or more stacks of views, panes, cards, containers, widgets, or other user interface elements, with each stack representing a group of IoT devices. The groupings can represent IoT devices corresponding to the same or similar portion of a name (e.g., prefix, infix, postfix, etc.), device type (e.g., fire alarms, security cameras, door locks) or class (e.g., connected vehicles, healthcare devices, industrial equipment, etc.), manufacturer, model, subnet address, physical location, device owner, policies, security score, virus/malware infection, anomalous behavior, and so forth. For example, the IoT management system can utilize machine learning clustering to identify the one or more groups of IoT devices. Selection of a stack of user interface elements can display individual user interface elements within the selected device group and/or one or more stacks of user interface elements representing subgroupings of the selected device group. Each user interface element 460 can be sorted based on device priority or anomaly priority. Each user interface element 460 can also be selected by the end user for displaying a detailed view of the IoT device exhibiting one or more anomalies.

Figure 4D:
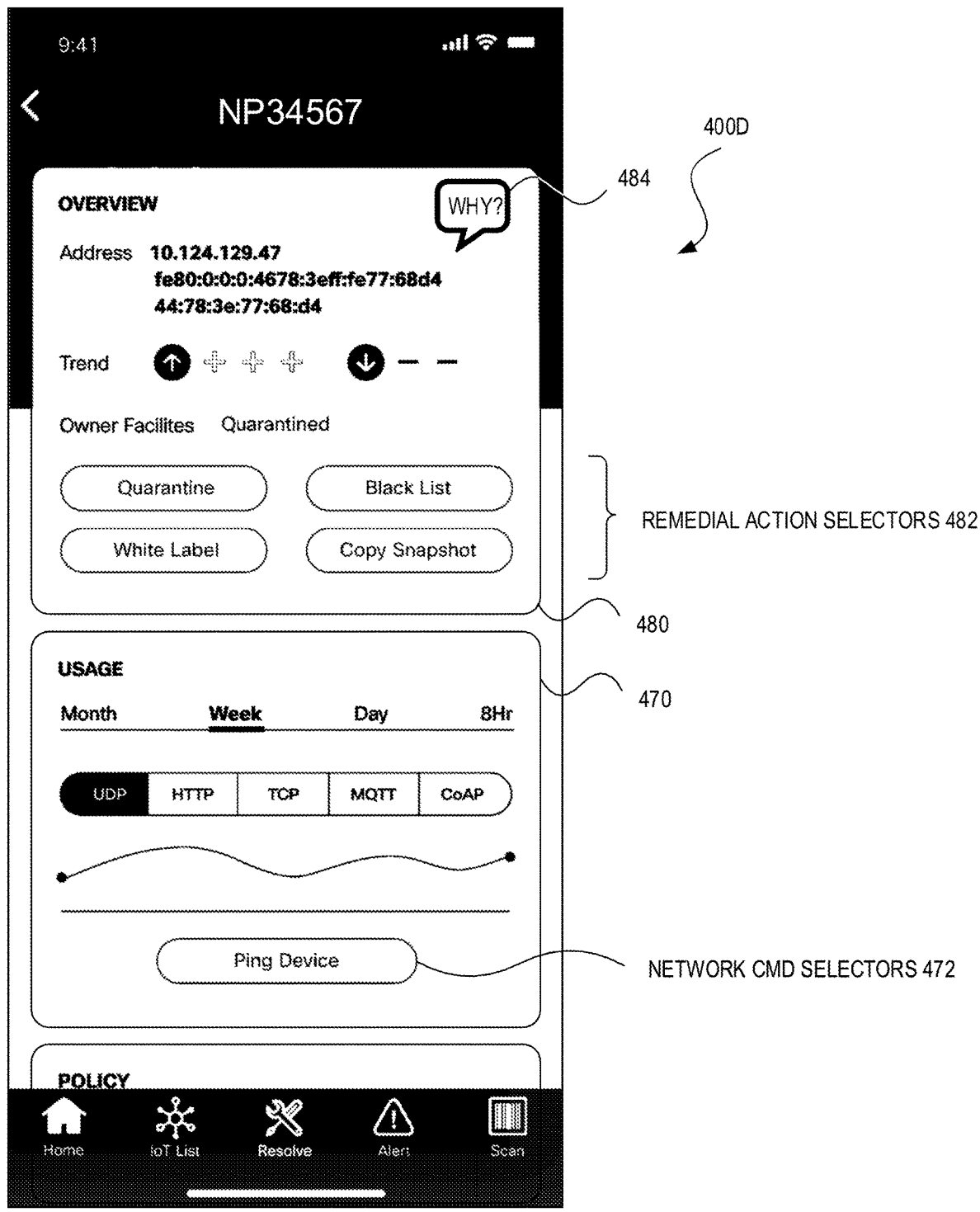

FIG. 4D illustrates an example of a graphical user interface 400D for a client application of an IoT management system. For example, the graphical user interface 400D can represent a detailed view of an IoT device exhibiting one or more anomalies, which the end user may navigate to by selecting the IoT device user interface element 460. The graphical user interface 400D can be similar in certain respects to the graphical user interface 400B, and may include a network usage user interface element 470 and an overview user interface element 480.

Similar to the network usage user interface element 430, the network usage user interface element 470 can include a time scale selection user interface element, a protocol selection user interface element, and usage information. However, in this example, the detailed view of the IoT device exhibiting one or more anomalies may also include a network command selection user interface element 472, which upon selection, can cause the IoT management system to ping the compromised or potentially compromised IoT device. In other embodiments, the network command selection user interface element 470 can alternatively or additionally perform other well-known network administrator commands, such as ifconfig, traceroute, netstat, tcpdump, and so forth.

Similar to the overview user interface element 440, the overview user interface element 480 can include network addresses, network traffic information, and a device policy. In this example, the overview user interface element 480 can also include remedial action selection user interface elements 482 that enable the end user to take remedial actions for the compromised or potentially compromised IoT device, such as to apply a specific network policy to the IoT device (e.g., quarantine, black list, white label, copy snapshot, etc.). In some embodiments, selection of a particular network policy can cause the client application to prompt whether to apply the selected policy to all devices within the same device group as the IoT device.

In this example, the overview user interface element 480 can also include an explainer selection user interface element 484, which upon selection, can enable the end user to drill down for additional details regarding why the compromised or potentially compromised IoT device has been put into the remediation interface.

Figure 4E:
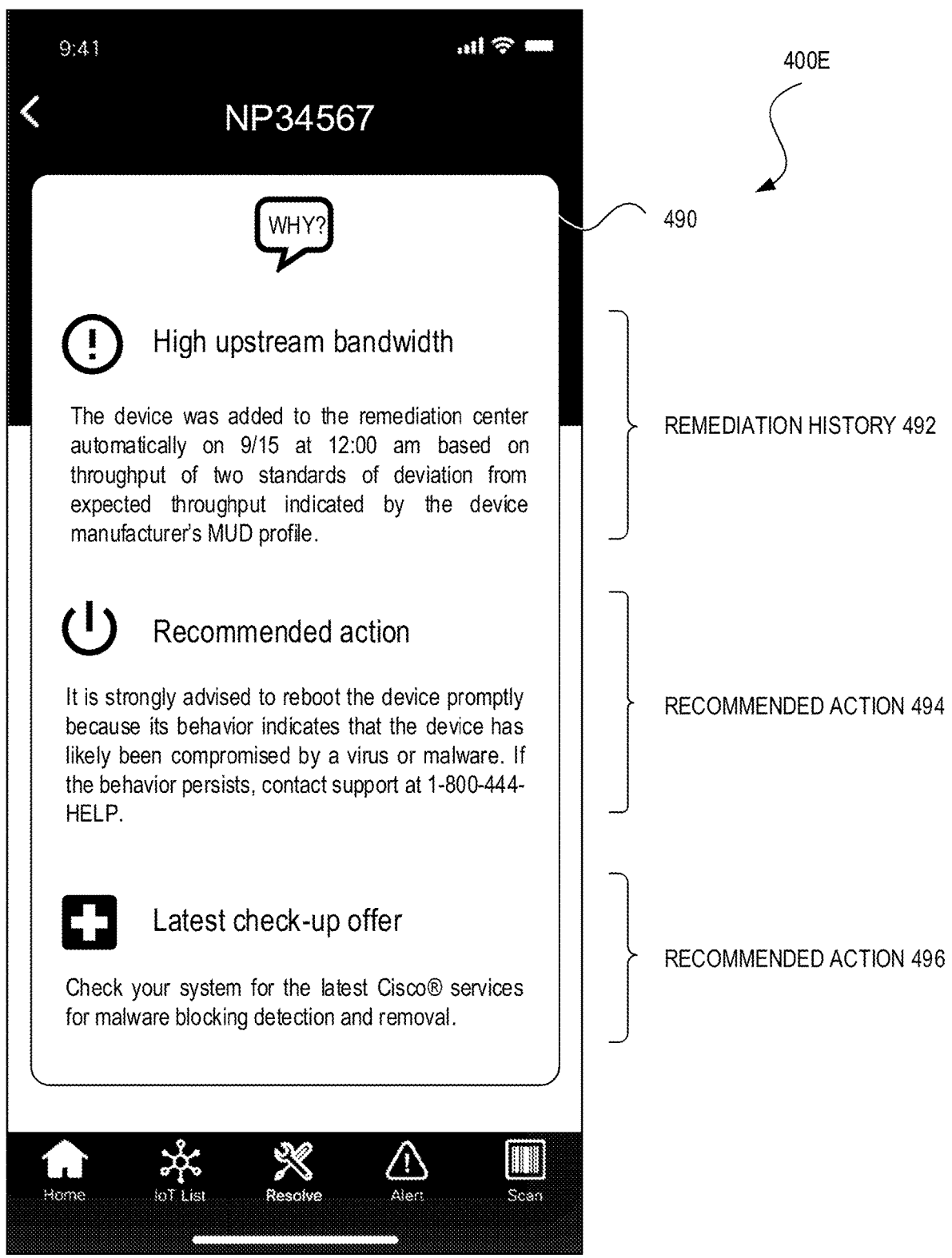

FIG. 4E illustrates an example of a graphical user interface 400E for the client application of the IoT management system. For example, the graphical user interface 400E can represent a detailed view of remediation information for an IoT device exhibiting one or more anomalies, which the end user may navigate to by selecting the explainer selection user interface element 480. The graphical user interface 400E can include one or more views, panes, cards, containers, widgets, or other user interface elements for presenting remediation information for the IoT device exhibiting one or more anomalies.

In this example, the graphical user interface 400E can include a remediation user interface element 490, which may comprise a remediation history 492 and one or more recommended remedial actions, such as recommended remedial actions 494 and 496. Although the graphical user interface 400E consists of a single user interface element here, in other embodiments the graphical user interface 400E can comprise multiple user interface elements, including separate user interface elements for the remediation history 492 and the one or more recommended remedial actions 494 and 496.

The remediation history 492 can include information indicative of the one or more anomalies exhibited by the IoT device, including a timestamp when the IoT device was added to the remediation interface, the policies or rules enforced to add the IoT device to the remediation interface, the security score, the deviation from a device profile, the cluster or classification identified by machine learning, and so forth. The recommended remedial actions 494 and 496 can include information for remedial actions that the end user may take to resolve the issues with the IoT device.

Figure 5:
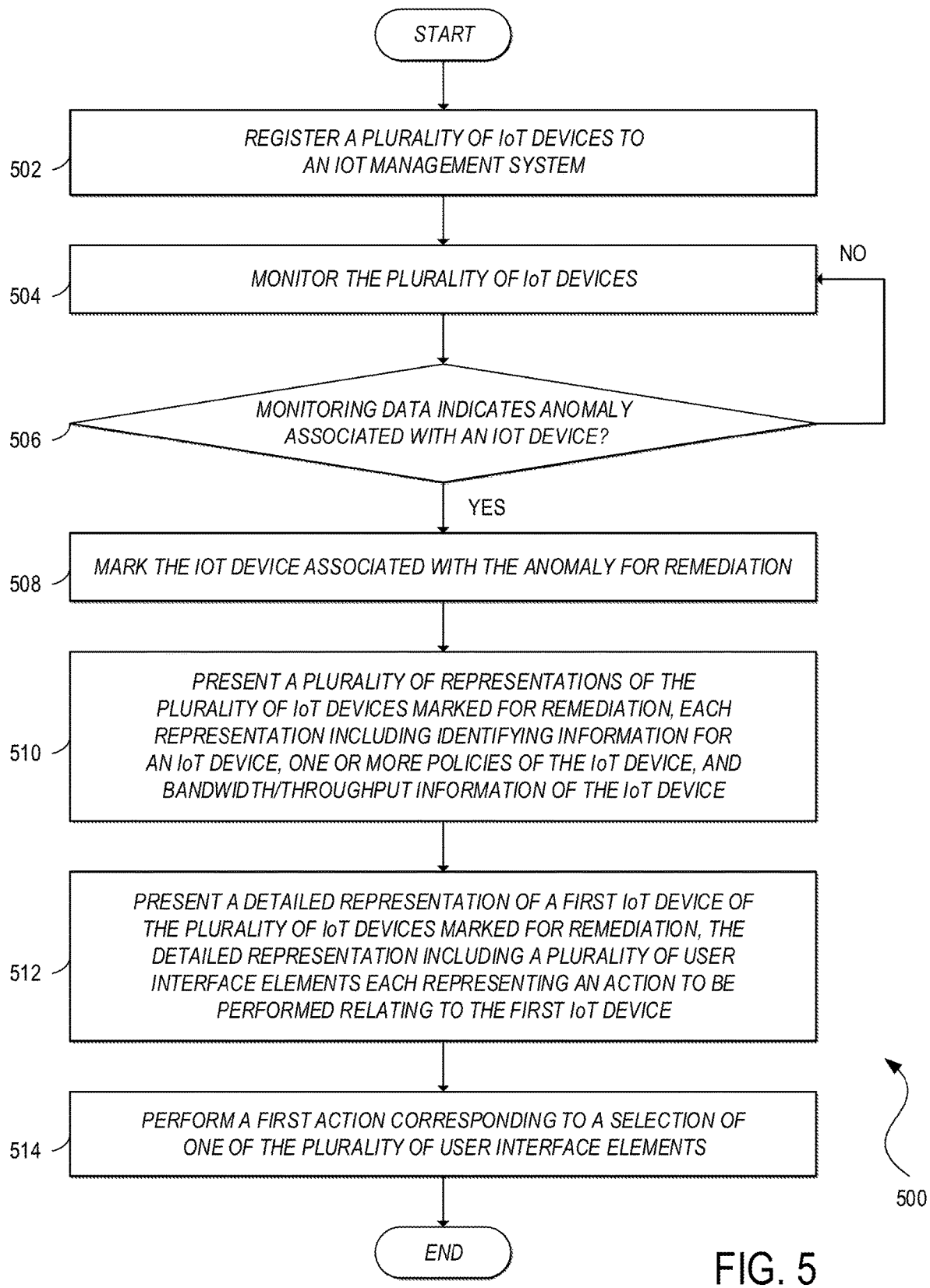
FIG. 5 illustrates an example of a process for remediating IoT devices administered by an IoT management system in accordance with an embodiment.

FIG. 5 illustrates an example of a process 500 for identifying and remediating IoT devices exhibiting anomalous behaviors. The process 500 may be performed in part or entirely by a provider of IoT management services operating a cloud network (e.g., the cloud network 110) or a fog network (e.g., the fog cloud 120), a network controller (e.g., the network controller 200) of a private network (e.g., the IoT cloud 130), an IoT device (e.g., the IoT device 134), a client device (e.g., the client device 136), and so forth.

The process 500 may begin with step 502 in which a plurality of IoT devices are registered to the IoT management system. In some embodiments, this can involve the IoT devices self-registering upon attempting to connect to the private network. In other embodiments, device registration may be initiated by the client device scanning a QR code, bar code, MAC address, serial number, or other unique identifying information or otherwise inputting the unique identifying information and transmitting the unique identifying information to the IoT management system. An example of a device registration process is discussed with respect to FIG. 3.

Once the IoT devices are registered, the IoT management system can monitor the IoT devices for performance, security, and other administrative issues at step 504. Monitoring can include tracking and analyzing network traffic data for the IoT devices at various levels of granularity (e.g., packet, flow, connection, session, etc.) and/or computing aggregate traffic data (e.g., traffic volume, throughput, delay, latency, jitter, data loss and other errors, etc.). In some embodiments, monitoring can also include tracking and analyzing general device information or application/process information (e.g., CPU usage, memory usage, disk usage, power usage, user information, etc.), device-specific or application/process-specific information (e.g., temperature data, unlocked/locked state, audio data, video data, etc.), and other information discussed throughout the present disclosure.

The process 500 may continue to decision block 506 in which the IoT management system determines whether any monitoring data indicates an anomaly associated with an IoT device, such as whether the IoT device is operating outside of expected ranges of measurements, behaving similarly to a known compromised device, deviating from routine behavior, and so forth. If the IoT management system evaluates a device to be associated with an anomaly, the process 500 can continue to step 508. If the IoT management system assesses that the IoT device is operating within expected ranges of measurement or not behaving anomalously, the process 500 can continue monitoring the IoT device at step 504.

In some embodiments, the IoT management system can monitor the IoT devices with respect to network security policies or rules (e.g., ACLs, security group rules, firewall rules, etc.). For example, if an IoT device attempts to access a portion of the network to which it is not allowed at any time, the IoT management system can mark or flag the device for remediation and move the device to a remediation interface. In other embodiments, the IoT management system can monitor the number of dropped or rejected packets/flows originating from the IoT device, and upon the number of dropped or rejected traffic exceeding a threshold amount, add the device to the remediation interface. In some of these cases, the threshold amount may include a temporal condition (e.g., a limit of the amount of dropped or rejected traffic in a day that is reset each day).

Alternatively or in addition, the IoT management system may monitor the IoT devices with respect to application-based policies (e.g., forbidden applications, network domain names, IP addresses, and the like; QoS or QoE rules; rules regarding average, minimum, and/or maximum network traffic volume, throughput, latency, jitter, packet loss, and other errors; rules regarding average, minimum, and/or maximum load, response time, computing resource usage, etc.). For example, if an IoT device transmits CoAP traffic but in an abnormally high volume in contravention to an application/process policy limiting CoAP traffic for a specific application, the IoT management system can add the device to the remediation interface.

Alternatively or in addition, the IoT management system may evaluate the IoT devices with respect to device-based policies or rules (e.g., operational time periods; expected ranges for network traffic volume, throughput, latency, jitter, packet loss, error, load, response times, computing resource usage, etc.; operating temperature range; operating air quality range; device state; and so forth). For example, if an IoT device wakes up at abnormal intervals despite device policies specifying a time period when the IoT device may operate, the IoT management system can add the IoT device to a remediation state.

Alternatively or in addition, the IoT management system may monitor the IoT devices with respect to device profiles, which may be provided by device manufacturers, industry standards groups, device profile databases, and the like. For example, a MUD profile for the IoT management system can include a set of specifications for operational ranges and behaviors of an IoT device. The IoT management system can analyze the IoT device's behavior based on the MUD profile, and mark the device for remediation if the IoT deviates from the specifications set forth in the MUD profile. In one embodiment, an IoT device can announce an organizationally unique identifier (OUI) during registration but may fail to transmit a MUD URL, or the device may transmit an OUI that does not correspond to the device based on the OUI or the device's traffic. In these instances, the IoT management system can flag the device for remediation.

Alternatively or in addition, the IoT management system may utilize machine learning for monitoring the IoT devices, such as using clustering or classification machine learning models for identifying whether the IoT devices are exhibiting anomalies (e.g., behaving or otherwise exhibiting characteristics similar to compromised devices or not behaving or otherwise not exhibiting characteristics similar to uncompromised devices). For example, if an IoT device with known keep alive and firmware update patterns begins downloading a larger firmware update than expected according to a machine learning model for that device or starts sending traffic consistent with a machine learning model for clustering or classifying traffic of a compromised device, the IoT management system can add the device to the remediation interface.

Alternatively or in addition, an end user can manually mark an IoT device as compromised or potentially comprised and add the device to a remediation interface. For example, there may be a public announcement regarding newly discovered vulnerabilities with certain types of devices and/or that such devices are currently subject to worldwide attacks. The end user can use a client application to search for these devices and flag the devices for remediation.

Table 2 sets forth examples of approaches for identifying IoT devices that may be behaving anomalously and that may require remediation.

TABLE 2

Examples of Approaches for Identifying Anomalous IoT Devices

| Monitored Data | Type of Policy or Baseline Data | Method of Analysis |
|---|---|---|
| Traffic Data | Network policy (e.g., ACL, security group rule, firewall rule, etc.) | Determine whether amount of dropped or rejected traffic to/from IoT device exceeds specified amount |
| | Application/process policy (e.g., prohibited applications, domain names, IP addresses, etc.; QoS/QoE rules; policies regarding network usage by a specified application/process; policies regarding application/process performance; etc.) | Determine whether traffic for application or process executing on IoT device violates application/process policy |
| | User/group policy (e.g., user or group permissions limiting access to specified network resources) | Determine whether traffic for user/group associated with IoT device violates user/group policy |
| | Device policy or profile (e.g., administrator-defined policy or MUD profile specifying operational time periods, expected ranges for network usage, expected ranges for application/process performance, expected ranges for device-specific data, etc.) | Determine whether traffic for IoT device violates device policy or deviates from device profile |
| | Machine learning model (e.g., clustering model or classification model that receives IoT device's traffic data and outputs cluster or classification) | Determine cluster or classification of IoT device from the IoT device's traffic, such as whether the IoT device is compromised/behaving a nomalously or uncompromised/behaving routinely |
| Application/Process Data | Application/process policy | Determine whether application/process executing on IoT device violates application/process policy |
| | User/group policy | Determine whether application/executing on IoT device violates user/group policy |
| | Device policy or profile | Determine whether application/process executing on IoT device violates device policy or deviates from device profile |

TABLE 2-continued

Examples of Approaches for Identifying Anomalous IoT Devices

| Monitored Data | Type of Policy or Baseline Data | Method of Analysis |
|---|---|---|
| | Machine learning model (e.g., clustering model or classification model that receives IoT device's application/process data and outputs cluster or classification) | Determine cluster or classification of IoT device from the IoT device's application/process data, such as whether the IoT device is compromised/behaving anomalously or uncompromised/behaving routinely |
| Device State Data | Application policy | Determine whether a state of IoT device violates application/process policy |
| | User/group policy | Determine whether a state of IoT device violates user/group policy |
| | Device policy or device profile | Determine whether a state of IoT device violates device policy or deviates from device profile |
| | Machine learning model (e.g., clustering model or classification model that receives IoT device's state data and outputs cluster or classification) | Determine cluster or classification of IoT device from a state of the IoT device, such as whether the IoT device is compromised/behaving anomalously or uncompromised/behaving routinely |

At step 508, the IoT management system can mark the IoT device exhibiting an anomaly for remediation, such as by adding the device to the remediation interface and/or updating state information of the IoT device indicating that the IoT device requires remediation.

The process 500 may then proceed to step 510 in which the IoT management system can present (e.g., transmit information for display in a client application executing on a client device) the remediation interface (e.g., representations of IoT devices in a remediation state). FIG. 4C illustrates an example of a graphical user interface for a first screen or webpage of the remediation interface, which can comprise a plurality of user interface elements (e.g., views, panes, tiles, cards, containers, widgets, etc.) representing the one or more IoT devices marked for remediation. Each individual user interface element can include identifying information (e.g., device name, IP address, MAC address, serial number, etc.), one or more policies of an individual IoT device (e.g., throttled bandwidth/throughput, quarantined, black listed, white listed or white labeled, rerouted traffic, etc.), and bandwidth/throughput information (e.g., number of standard deviations more than or less than the mean, median, mode, or expected bandwidth/throughput or other network traffic metric). In some embodiments, each individual representation of an IoT device can additionally or alternatively include a number of alerts for the IoT device, a number of metadata tags, a number of application policies, a number of network policies, a number of connections, network usage information, and so forth.

In some embodiments, the IoT management system can group a set of IoT devices that correspond to a same or similar portion of a name, device or class, manufacturer, model, subnet address, physical location, device owner, policies, security score, virus/malware infection, anomalous behavior, and so forth. The group of IoT devices can be represented as a stack of user interface elements within the remediation interface. Selection of one of the stacks can cause the display of individual representations of IoT devices of the selected device group and/or representations of subgroups of the selected device group.

At step 512, the IoT management system can present a detailed representation of an IoT device of the remediation interface, such as in response to a selection of a user interface element of the remediation interface that corresponds to the IoT device. The detailed representation can include a plurality of user interface elements in which each user interface element can represent an action to be performed relating to the IoT device, including remedial actions (e.g., throttle bandwidth/throughput, quarantine, black last, white list or white label, reroute traffic, etc.) or network administrative actions (e.g., ping, ifconfig, traceroute, netstat, tcpdump, etc.). FIG. 4D illustrates an example of a graphical user interface for the detailed representation of the IoT device that may require remediation.

The process 500 can conclude at step 514 in which the IoT management system may perform an action corresponding to a selection of one of the plurality of user interface elements. This can involve applying one or more policies or rules for an IoT device exhibiting one or more anomalies, such as throttling the device's bandwidth/throughput (e.g., reducing the device's network bandwidth/throughput), quarantining the device (e.g., temporarily dropping or rejecting traffic to/from the device), blacklisting the device (e.g., permanently dropping or rejecting traffic to/from the device), intensifying monitoring of the device (e.g., rerouting the device's traffic through a deep packet inspection (DPI) service or device, an intrusion detection system (IDS)/intrusion prevention system (IPS), a packet capture or flow collector service or device, a remediation server, etc.), powering down the device, rebooting the device, resetting factory defaults, reinstalling the device's firmware or software, pushing security fixes, and/or taking another remedial action, including white listing or white labeling a device (e.g., the IoT management system may initially quarantine a compromised or potentially compromised device but, upon further analysis, the end user may determine that the device is behaving properly and white list or white label the device). In some embodiments, the actions may also include network administrator commands and tools, such as ping, ifconfig, traceroute, netstat, tcpdump, and the like.

In some embodiments, the IoT management system may automatically apply the policies or rules the moment an IoT device has been marked for remediation. In other embodiments, the IoT management system can prescribe a recommended course of action and perform an action selected by an end user. In still other embodiments, the IoT management system can utilize a combination of these approaches (e.g., automatically throttling bandwidth/throughput or quarantining a compromised or potentially compromised device and prompting the end user to perform additional remediation). The policies and rules the IoT management system can automatically enforce versus prompting for user approval may depend on factors such as the type of the device, the security group of the device, the device's subnet address, the device's physical location, the device's security score, the type or severity of the vulnerability, and other factors discussed throughout the present disclosure.

Figure 6A:
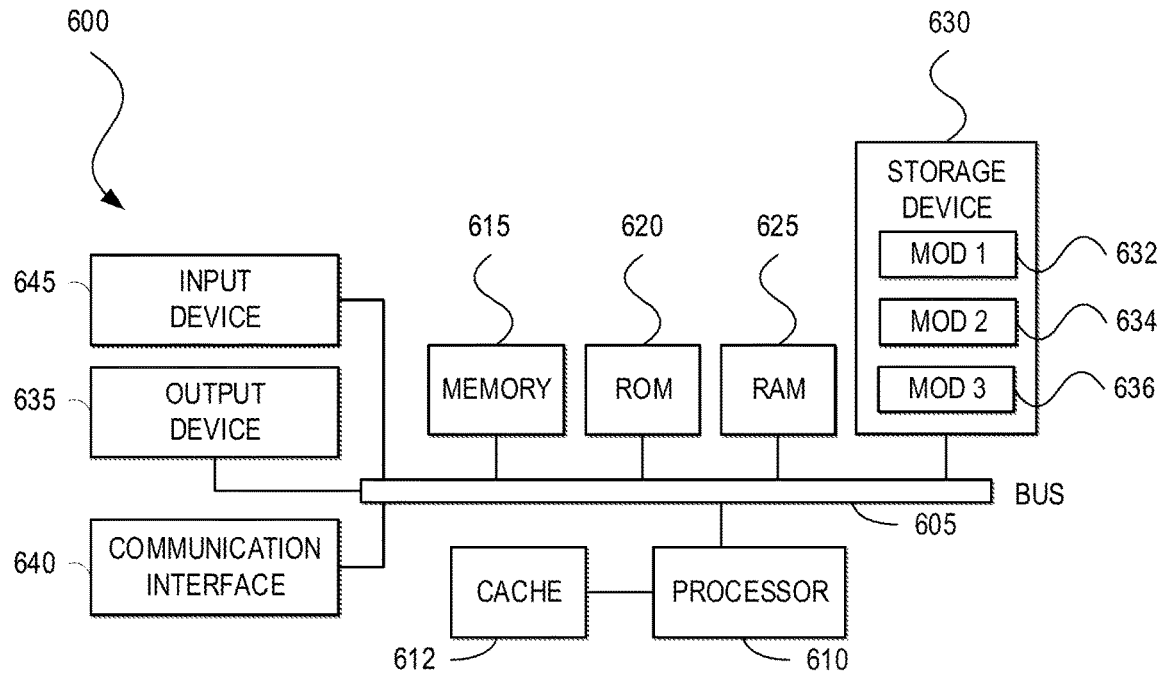
FIGS. 6A and 6B illustrate examples of systems in accordance with some embodiments.
Figure 6B:
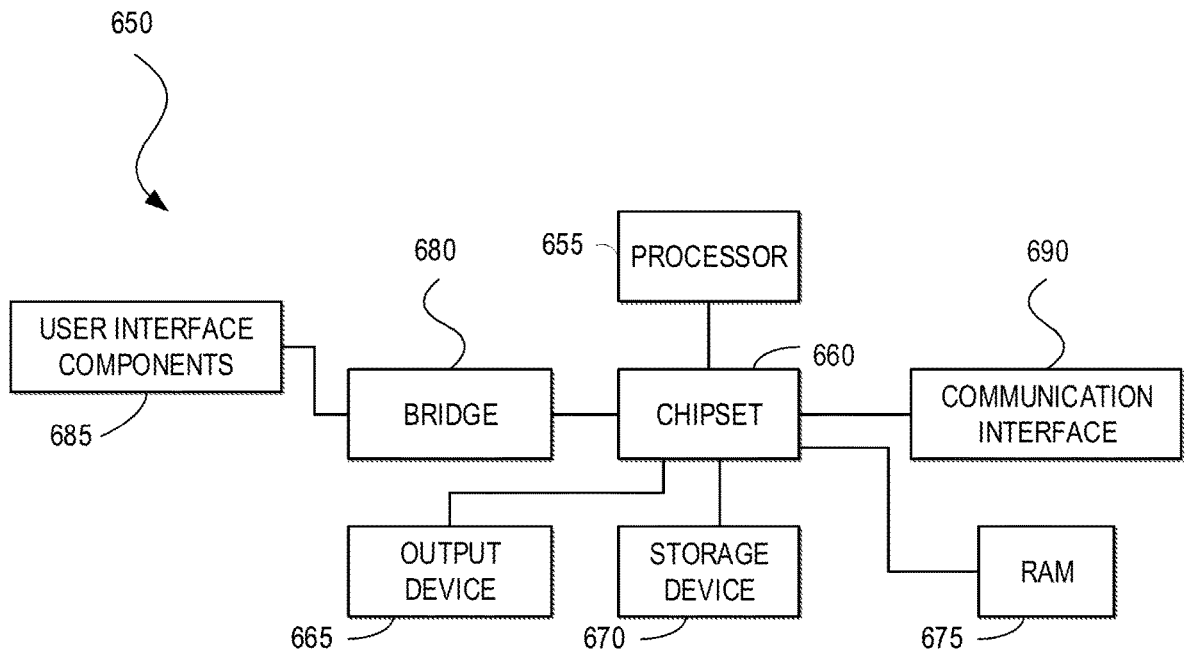

FIG. 6A and FIG. 6B illustrate systems in accordance with various embodiments. The more appropriate system will be apparent to those of ordinary skill in the art when practicing the various embodiments. Persons of ordinary skill in the art will also readily appreciate that other systems are possible.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
monitoring network traffic of IoT (Internet of Things) devices on one or more networks;
identifying, based on the monitoring, a plurality of IoT devices marked for remediation of the IoT devices;
presenting a first graphical user interface including a plurality of representations of the plurality of IoT devices marked for remediation, each representation including identifying information for an IoT device, one or more policies applied to the IoT device, and bandwidth or throughput information of the IoT device;
presenting, in response to a selection of a first IoT device at the first graphical user interface, a second graphical user interface including a detailed representation of the first IoT device of the plurality of IoT devices marked for remediation, the detailed representation including a plurality of user interface elements representing a plurality of actions to be performed relating to the first IoT device; and
performing a remediation action of the plurality of actions corresponding to a selection of one of the plurality of user interface elements.

2. The computer-implemented method of claim 1, further comprising:
monitoring traffic data of the first IoT device;
determining that the traffic data indicates an anomaly of the first IoT device based on one or more network policies, application policies, device policies, device profiles, or machine learning models; and
adding the first IoT device to the first graphical user interface.

3. The computer-implemented method of claim 1, further comprising:
monitoring process data for a process executing on the first IoT device;
determining that the process data indicates an anomaly of the first IoT device based on one or more application policies, device policies, device profiles, or machine learning models; and
adding the first IoT device to the first graphical user interface.

4. The computer-implemented method of claim 1, further comprising:
monitoring device state information of the first IoT device;
determining that the device state information indicates an anomaly of the first IoT device based on one or more application policies, device policies, device profiles, or machine learning models; and
adding the first IoT device to the first graphical user interface.

5. The computer-implemented method of claim 1, further comprising:
updating the bandwidth or throughput information in real-time.

6. The computer-implemented method of claim 1, further comprising:
determining a first number of standard deviations from a mean, median, mode, or expected upload bandwidth or throughput for each of the plurality of IoT devices marked for remediation;
determining a second number of standard deviations from a mean, median, mode, or expected download bandwidth or throughput for each of the plurality of IoT devices marked for remediation; and
generating for presentation the bandwidth or throughput information of each IoT device of the plurality of IoT devices marked for remediation using the first number of standard deviations from the mean, median, mode, or expected upload bandwidth or throughput of the IoT device and the second number of standard deviations from the mean, median, mode, or expected download bandwidth or throughput of the IoT device.

7. The computer-implemented method of claim 1, further comprising:
determining a group of IoT devices from among the plurality of IoT devices based on one or more shared characteristics among the group; and
presenting a stacked representation of the group of IoT devices in the first graphical user interface.

8. The computer-implemented method of claim 7, further comprising:
receiving a selection of the stacked representation of the group of IoT devices; and
presenting a third graphical user interface including a second plurality of representations of the group of IoT devices,
wherein at least one representation of the second plurality of representations corresponds to an individual IoT device of the group of IoT devices.

9. The computer-implemented method of claim 8, wherein at least one representation of the second plurality of representations corresponds to a subgroup of two or more IoT devices of the group of IoT devices.

10. The computer-implemented method of claim 1, further comprising:
receiving registration information for the first IoT device via a client device scanning a machine-readable code of the first IoT device.

11. The computer-implemented method of claim 1, further comprising:
receiving a request including a uniform resource locator to a machine usage description for the first IoT device; and
registering the first IoT device based on the request.

12. The computer-implemented method of claim 1, further comprising:
presenting a third graphical user interface including information relating to the first IoT device being added to the first graphical user interface.

13. A system, comprising:
one or more processors;
at least one computer-readable storage medium having stored therein instructions which, when executed by the one or more processors, cause the system to:
monitor network traffic of IoT (Internet of Things) devices on one or more networks;
identify, based on the monitoring, a plurality of IoT devices of the IoT devices marked for remediation;
present a first graphical user interface including a plurality of representations of the plurality of IoT devices marked for remediation, each representation including identifying information for an IoT device, one or more policies applied to the IoT device, and bandwidth or throughput information of the IoT device;
present, in response to a selection of a first IoT device at the first graphical user interface, a second graphical user interface including a detailed representation of a first IoT device of the plurality of IoT devices marked for remediation, the detailed representation including a plurality of user interface elements representing a plurality of action to be performed relating to the first IoT device; and
perform a remediation action of the plurality of actions corresponding to a selection of one of the plurality of user interface elements.

14. The system of claim 13, further comprising instructions which when executed further cause the system to:
monitor traffic data of the first IoT device;
determine that the traffic data indicates an anomaly of the first IoT device based on one or more network policies, application policies, device policies, device profiles, or machine learning models; and
add the first IoT device to the first graphical user interface.

15. The system of claim 13, further comprising instructions which when executed further cause the system to:
determine a first number of standard deviations from a mean, median, mode, or expected upload bandwidth or throughput for each of the plurality of IoT devices marked for remediation;
determine a second number of standard deviations from a mean, median, mode, or expected download bandwidth or throughput for each of the plurality of IoT devices marked for remediation; and
generate for presentation the bandwidth or throughput information of each IoT device of the plurality of IoT devices marked for remediation using the first number of standard deviations from the mean, median, mode, or expected upload bandwidth or throughput of the IoT device and the second number of standard deviations from the mean, median, mode, or expected download bandwidth or throughput of the IoT device.

16. The system of claim 13, further comprising instructions which when executed further cause the system to:
determine a group of IoT devices from among the plurality of IoT devices based on one or more shared characteristics among the group; and
present a stacked representation of the group of IoT devices in the first graphical user interface.

17. A non-transitory computer-readable storage medium having stored therein instructions which, when executed by one or more processors of a system, cause the system to:
monitor network traffic of IoT (Internet of Things) devices on one or more networks;
identify, based on the monitoring, a plurality of IoT devices of the IoT devices marked for remediation;
present a first graphical user interface including a plurality of representations of the plurality of IoT devices marked for remediation, each representation including identifying information for an IoT device, one or more policies applied to the IoT device, and bandwidth or throughput information of the IoT device;
present, in response to a selection of a first IoT device at the first graphical user interface, a second graphical user interface including a detailed representation of a first IoT device of the plurality of IoT devices marked for remediation, the detailed representation including a plurality of user interface elements representing a plurality of action to be performed relating to the first IoT device; and
perform a first remediation of the plurality of actions corresponding to a selection of one of the plurality of user interface elements.

18. The non-transitory computer-readable storage medium of claim 17, further comprising instructions which when executed further cause the system to:
monitor device state information of the first IoT device;
determine that the device state information indicates an anomaly of the first IoT device based on one or more application policies, device policies, device profiles, or machine learning models; and
add the first IoT device to the first graphical user interface.

19. The non-transitory computer-readable storage medium of claim 17, further comprising instructions which when executed further cause the system to:
determine a group of IoT devices from among the plurality of IoT devices based on one or more shared characteristics among the group; and
present a stacked representation of the group of IoT devices in the first graphical user interface.

20. The non-transitory computer-readable storage medium of claim 17, further comprising instructions which when executed further cause the system to:
receive registration information for the first IoT device via a client device scanning a machine-readable code of the first IoT device.

* * * * *